(12) United States Patent
Yamada et al.

(10) Patent No.: US 10,831,885 B2
(45) Date of Patent: Nov. 10, 2020

(54) PROGRAM BEHAVIOR MONITORING CONTROL APPARATUS, DISTRIBUTED OBJECT CREATION MANAGEMENT APPARATUS, RECORDING MEDIUM, AND PROGRAM BEHAVIOR MONITORING SYSTEM

(71) Applicant: Soliton Systems K.K., Tokyo (JP)

(72) Inventors: Tomoaki Yamada, Tokyo (JP); Sumiko Takahagi, Tokyo (JP)

(73) Assignee: SOLITON SYSTEMS K.K., Tokyo (JP)

( * ) Notice: Subject to any disclaimer, the term of this patent is extended or adjusted under 35 U.S.C. 154(b) by 0 days.

(21) Appl. No.: 15/524,604

(22) PCT Filed: Feb. 28, 2017

(86) PCT No.: PCT/JP2017/007900
§ 371 (c)(1),
(2) Date: May 4, 2017

(87) PCT Pub. No.: WO2018/078902
PCT Pub. Date: May 3, 2018

(65) Prior Publication Data
US 2018/0300474 A1    Oct. 18, 2018

(30) Foreign Application Priority Data

Oct. 31, 2016   (JP) ................... 2016-212993

(51) Int. Cl.
*G06F 21/53* (2013.01)
(52) U.S. Cl.
CPC ........ *G06F 21/53* (2013.01); *G06F 2221/033* (2013.01)
(58) Field of Classification Search
CPC ......... G06F 21/53; G06F 21/55; G06F 21/552
See application file for complete search history.

(56) References Cited

U.S. PATENT DOCUMENTS

| 6,425,017 B1 | 7/2002 | Dievendorff et al. |
| 9,148,428 B1 * | 9/2015 | Banga ................... G06F 9/5027 |

(Continued)

FOREIGN PATENT DOCUMENTS

| EP | 2782040 A1 | 9/2014 |
| JP | 2006260588 A | 9/2006 |

(Continued)

OTHER PUBLICATIONS

Japanese Patent Office, Notice of Allowance, dated Feb. 1, 2017.

(Continued)

*Primary Examiner* — Noura Zoubair
(74) *Attorney, Agent, or Firm* — Alston & Bird LLP

(57) ABSTRACT

A first aspect of the present invention includes: a monitored process management unit configured to register identification information of a monitored process, which is an execution entity of an application program and which is to be monitored, in a monitored process list and, when there is an inquiry as to whether or not an arbitrary process is a monitored process from an inquiry source, configured to inquire the monitored process list for identification information of the arbitrary process, and moreover configured to return information on whether or not the arbitrary process is a monitored process to the inquiry source; and a notification receiving unit configured to receive, when a distributed object creation management apparatus configured to create a distributed object server and retain identification information of the distributed object server receives a usage request of a distributed object server from a monitored process, a prescribed notification from the distributed object creation management apparatus.

6 Claims, 15 Drawing Sheets

(56) References Cited

U.S. PATENT DOCUMENTS

| | | | | |
|---|---|---|---|---|
| 2010/0057774 A1* | 3/2010 | Pizano | ............... | G06F 21/53 |
| | | | | 707/E17.055 |
| 2011/0047613 A1* | 2/2011 | Walsh | ............... | G06F 21/53 |
| | | | | 726/16 |
| 2012/0260250 A1 | 10/2012 | Maeda et al. | | |
| 2013/0097603 A1 | 4/2013 | Amano et al. | | |
| 2015/0324586 A1* | 11/2015 | Ghosh | ............... | G06F 21/56 |
| | | | | 726/23 |
| 2016/0057107 A1* | 2/2016 | Call | ............... | H04L 63/02 |
| | | | | 726/11 |

FOREIGN PATENT DOCUMENTS

| | | |
|---|---|---|
| JP | 2014016877 A | 1/2014 |
| JP | 2014182837 A | 9/2014 |

OTHER PUBLICATIONS

WIPO Application No. PCT/JP2017/007900, International Search Report, dated Apr. 11, 2017.
EPO Application No. EP 17718713.5, Supplementary European Search Report and European Search Opinion, dated Feb. 6, 2018.
WIPO Application No. PCT/JP2017/007900, International Written Opinion, dated Apr. 11, 2017.
WIPO Application No. PCT/JP2017/007900, International Preliminary Report on Patentability, dated Apr. 30, 2019.

\* cited by examiner

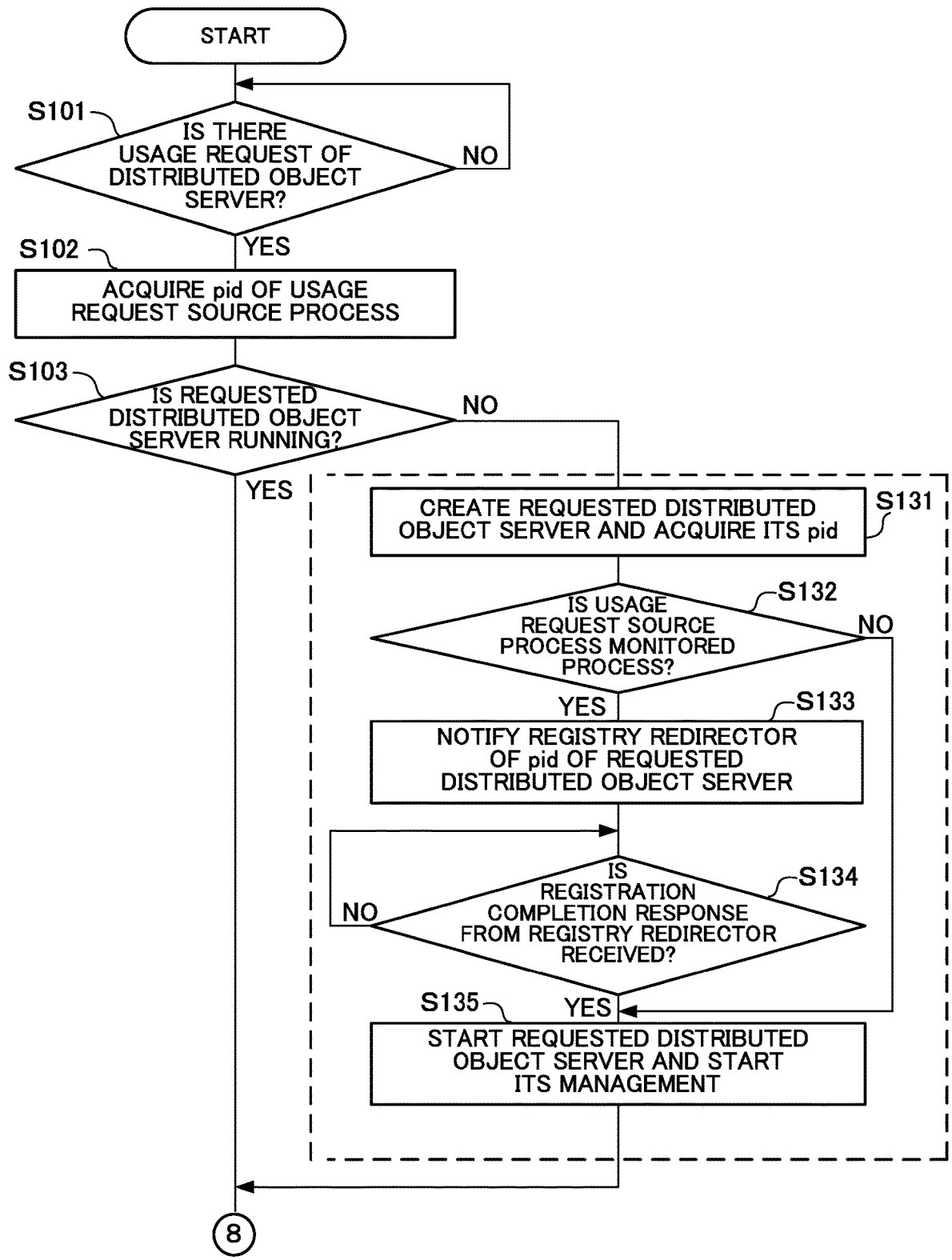

PROGRAM BEHAVIOR MONITORING CONTROL APPARATUS, DISTRIBUTED OBJECT CREATION MANAGEMENT APPARATUS, RECORDING MEDIUM, AND PROGRAM BEHAVIOR MONITORING SYSTEM

TECHNICAL FIELD

The present invention relates to a program behavior monitoring control apparatus, a distributed object creation management apparatus, a recording medium, and a program behavior monitoring system.

BACKGROUND ART

Conventionally, a process which is an execution entity of an application program is divided and segmented according to functions in order to improve efficiency of software development. Examples of methods of dividing and segmenting a process include a method in which the process creates and starts a separate process and causes the separate process to execute integrated processing.

As a first method by which a process causes a separate process to perform processing, there is a technique in which the process creates a child process as the separate process and requests the child process to perform processing.

In this case, in addition to network communication technology such as TCP/IP and general interprocess communication technology such as a named pipe provided by an OS, communication between parent and child processes may also be realized by executing a closed exchange of data between the parent and child processes by sharing memory resources.

On the other hand, when contents of processing by a divided and segmented process are highly versatile, distributed object technology is available as a second method by which a process causes a separate process to perform processing. In the distributed object technology, a distributed object server which is a process for performing versatile processing in accordance with a common calling convention is created as the separate process and started.

For example, when a first process desires to perform versatile and integrated processing by using a separate process, the first process notifies a distributed object creation management unit provided by an OS of a usage request of a distributed object server capable of executing the integrated processing.

When the specified distributed object server is not running at a time of the notification, the distributed object creation management unit creates and starts the distributed object server and returns a response including an access method to the distributed object server to the first process of the usage request source.

Meanwhile, when a second process also desires to perform the versatile and integrated processing described above by using a separate process, the second process notifies the distributed object creation management unit of a usage request of the distributed object server.

This time, since the specified distributed object server is already running, the distributed object creation management unit simply returns a response including an access method to the distributed object server to the second process of the usage request source.

In the first method described above, processing by the parent process and the child process is executed in a closed area inside a single computer. In comparison, the second method also includes a case where processing by the second process of the usage request source and processing by the distributed object server are executed on different computers.

Therefore, in the second method, in principle, a communication method between the usage request source process and the distributed object creation management unit as well as a communication method between the usage request source process and the distributed object server are limited to an interprocess communication method based on the network communication technology described earlier.

As described above, in distributed object technology, a software system is divided into independent programs which provide versatile and integrated processing and a distributed object server is created and started for each independent program. Accordingly, reusability of programs can be significantly increased and a significant improvement in development efficiency can be expected by, for instance, eliminating the need to reconstruct an entire software system even after partially revising the software system.

Furthermore, by defining roles of a plurality of distributed object servers and by subsequently creating and starting the plurality of distributed object servers in parallel on a plurality of computers, computing resources can be utilized in an efficient manner.

If a distributed object server is not running when a usage request is made by a process, the distributed object server is created and started by the distributed object creation management unit. In this manner, the creation and the start of a distributed object server are triggered by a usage request from a process of a usage request source. If a distributed object server is already running, the usage request source process reuses the distributed object server which is already running in principle. Therefore, a relationship between the usage request source process and the distributed object server does not correspond to a direct parent-child relationship such as that observed between the parent process and the child process described earlier.

On the other hand, there is a security mechanism called a sandbox which, by executing an unreliable program in a prescribed protected area within a system, prevents the program from illegally operating the system.

When a program is executed in the sandbox, a process which is an execution entity of the program is created and started in a state where the process is monitored so that the process does not operate other processes, data, and the like. Therefore, even when the process goes out of control or activates a virus, the outside of the sandbox is not affected. Hereinafter, a process created and started inside a sandbox will be referred to as a "monitored process".

PTL 1 discloses a technique related to a monitored process and a child process thereof, the monitored process being an execution entity of a program executed in a virtual area as a sandbox in which a file system, a registry, and the like, are virtualized. In PTL 1, a determination is made on whether a child process created and started (and becomes a monitored one) by the monitored process as a parent process is to use the same virtual area as that for the parent process or a new virtual area is to be created specifically for the child process. In other words, in the technique according to PTL 1, a child process can also be made as a monitored process when its parent process is a monitored one.

In other words, when a monitored process directly creates and starts a child process inside a sandbox, a parent-child relationship between those processes is clear. Therefore, the child process can be readily made as a monitored one.

CITATION LIST

Patent Literature

[PTL 1] Japanese Patent Application Laid-open No. 2010-205186

SUMMARY OF INVENTION

Technical Problem

The present invention has been made in order to solve problems existing in conventional art.

Solution to Problem

A program behavior monitoring control apparatus according to a first aspect of the present invention includes: a monitored process management unit configured to register identification information of a monitored process, which is an execution entity of an application program and which is to be monitored, in a monitored process list and, when there is an inquiry as to whether or not an arbitrary process is a monitored process from an inquiry source, configured to inquire the monitored process list for identification information of the arbitrary process, and moreover configured to return information on whether or not the arbitrary process is a monitored process to the inquiry source; and, a notification receiving unit configured to receive, when a distributed object creation management apparatus configured to create a distributed object server and retain identification information of the distributed object server receives a usage request of a distributed object server from a monitored process, a prescribed notification from the distributed object creation management apparatus.

A distributed object creation management apparatus according to a second aspect of the present invention includes: a usage request receiving unit configured to receive a usage request of a distributed object server from a process which is an execution entity of an application program; a distributed object server creation unit configured to create, when identification information of a request source process of the usage request received by the usage request receiving unit is not registered in a monitored process list, the distributed object server for which the usage request has been made; and, a notification sending unit configured to send, when the identification information of the request source process of the usage request received by the usage request receiving unit is registered in the monitored process list, a prescribed notification to a program behavior monitoring control apparatus.

A program behavior monitoring system according to a third aspect of the present invention includes: the program behavior monitoring control apparatus described above; and the distributed object creation management apparatus described above.

Advantageous Effects of Invention

According to any of the aspects of the present invention, not only program behavior of a monitored process but also program behavior of a distributed object server which is created and started based on a usage request from the monitored process can be monitored without omission.

BRIEF DESCRIPTION OF DRAWINGS

FIG. 15 is a flow chart showing a third distributed object server creation management routine.

DESCRIPTION OF EMBODIMENTS

Embodiments of the present invention will now be described in detail with reference to the drawings.

First Embodiment

Figure 1:
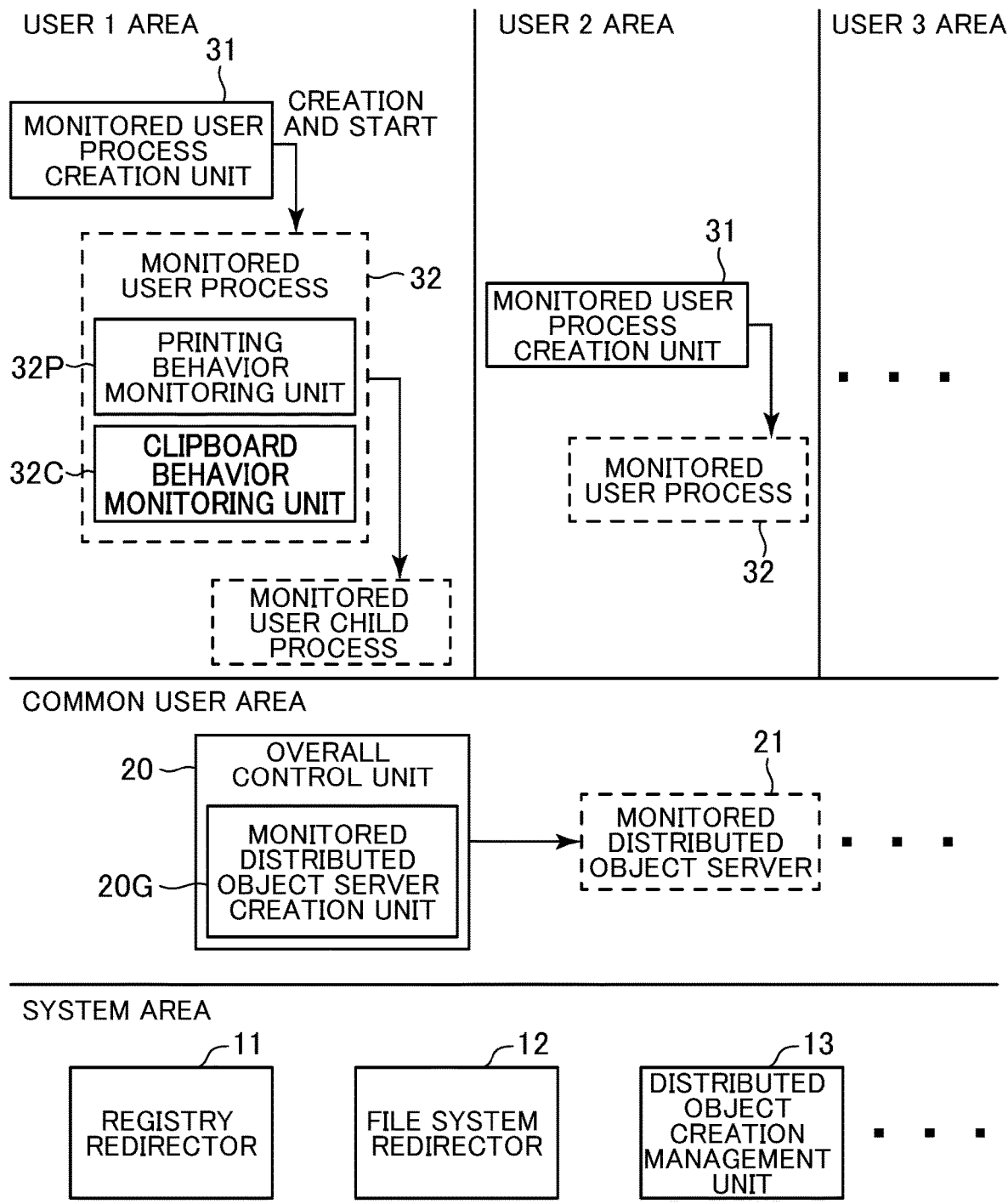
FIG. 1 is a block diagram showing a configuration of a program behavior monitoring system according to a first embodiment of the present invention.

FIG. 1 is a block diagram showing a configuration of a program behavior monitoring system 1 according to a first embodiment of the present invention.

The program behavior monitoring system 1 is constituted by function blocks provided in respective memory areas of: a system area which is a memory area in which processes necessary for running a system such as an OS (Operating System) operate; a common user area which is a memory area in which processes usable in a shared manner by all users operate; and individual user areas (a user 1 area, a user 2 area, . . . ) which are memory areas in which processes usable by individual users operate.

Among one or more processes in an individual user area, the program behavior monitoring system 1 monitors various behavior of a process (a monitored user process 32) which is created and started as an execution entity of a program, which is specified to execute inside a sandbox by a user and whose process as an execution entity of the program is made as a monitored one, as well as various behavior of descendant processes of the monitored user process 32. In addition, among one or more distributed object servers in the common user area, the program behavior monitoring system 1 monitors various behavior of a distributed object server (a monitored distributed object server 21) which is created based on a usage request of a monitored user process 32 or the like. Hereinafter, a process including the monitored user process 32 and the monitored distributed object server 21 will be referred to as a "monitored process".

The program behavior monitoring system 1 includes, as function blocks that operate in the system area, a registry redirector 11, a file system redirector 12, and a distributed object creation management unit 13.

The program behavior monitoring system 1 includes an overall control unit 20 as a function block that operates in the common user area. The overall control unit 20 internally includes a monitored distributed object server creation unit 20G.

Furthermore, as function blocks that operate in individual user areas, the program behavior monitoring system 1 includes: a monitored user process creation unit 31; and a printing behavior monitoring unit 32P and a clipboard behavior monitoring unit 32C which are created inside a monitored user process 32.

The overall control unit 20 controls an entire program behavior monitoring service which monitors behavior of a monitored process. In addition, the overall control unit 20 is capable of creating and starting a distributed object server as a monitored process (a monitored distributed object server 21) by using the monitored distributed object server creation unit 20G internally included in the overall control unit 20.

The registry redirector 11 resides in the system area and executes monitoring, control, and registry-protection in registry access behavior by a monitored process. Here, when an OS is Microsoft Windows (registered trademark) for example, a registry refers to a database of setting information used in the OS in which basic information related to the OS, settings of various application programs, extended information, and the like are registered.

The file system redirector 12 resides in the system area and executes monitoring, control, and file-protection in file access behavior by a monitored process.

The monitored user process creation unit 31 resides in the individual user areas and creates and starts a monitored user process 32 inside an individual user area allocated to a relevant user.

The printing behavior monitoring unit 32P resides within an arbitrary process which is created and started in an individual user area, and executes monitoring and control of a printing operation performed using the process by the user.

The clipboard behavior monitoring unit 32C resides within an arbitrary process which is created and started in an individual user area, and executes monitoring, control, and data-protection in a clipboard operation in which the process by the user is involved. Here, a clipboard refers to a function for temporarily storing data which is "copied" or "cut" by the user in order to realize exchange of data between different programs.

While the distributed object creation management unit 13 is provided as one of standard function blocks of the OS, in the present embodiment, the distributed object creation management unit 13 is further equipped with an additional function for causing the overall control unit 20 to monitor the monitored distributed object server 21.

When the distributed object creation management unit 13 receives a creation request of a distributed object server from a process in an individual user area, the distributed object creation management unit 13 creates the distributed object server in the common user area and acquires a pid of the distributed object server as a standard function of the OS.

When the distributed object creation management unit 13 receives a creation request of a distributed object server from a monitored user process 32 in an individual user area, the distributed object creation management unit 13 issues a request to the overall control unit 20 in the common user area to create the requested distributed object server (a monitored distributed object server 21) as the additional function described above. After the requested monitored distributed object server 21 is created, the distributed object creation management unit 13 acquires the pid of the requested monitored distributed object server 21 from the overall control unit 20.

Here, the distributed object creation management unit 13 acquires pids of all distributed object servers in the common user area regardless of whether or not the distributed object servers are monitored processes and uses the pids to manage the distributed object servers. In addition, the distributed object creation management unit 13 may also be equipped with a function for additionally managing a state of the distributed object servers managed by the distributed object creation management unit 13 itself with respect to which distributed object server is a monitored process.

On the other hand, as indicated by rectangles depicted by dashed lines in FIG. 1, a monitored user process 32, a descendant process of the monitored user process 32, and a monitored distributed object server 21 created and started in the common user area correspond to monitored processes which are created and started as monitored ones. While a detailed description will be given later, pids of all monitored processes are registered in the registry redirector 11.

Figure 2:
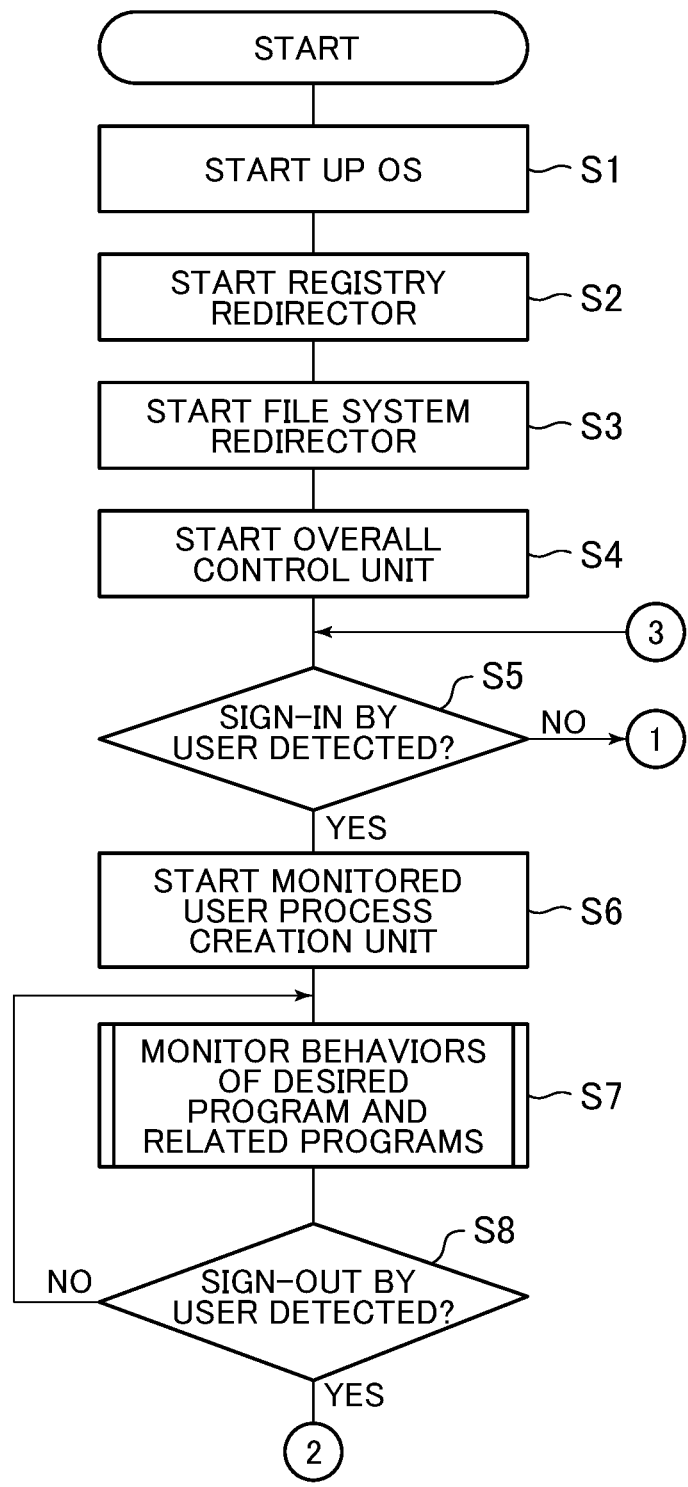
FIG. 2 is a flow chart showing behavior procedures from start to termination of a program behavior monitoring system.
Figure 3:
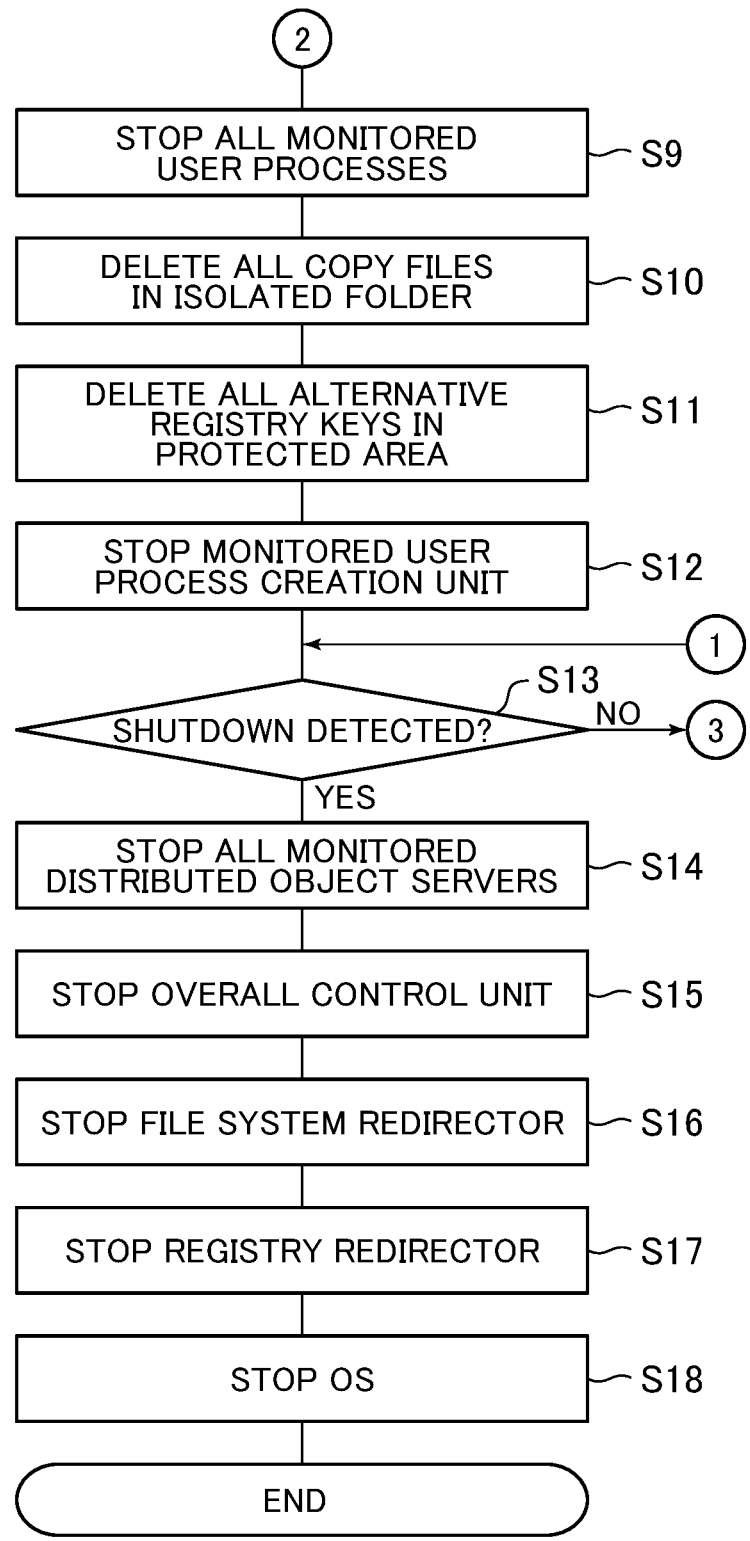
FIG. 3 is a flow chart showing behavior procedures from start to termination of a program behavior monitoring system.

FIGS. 2 and 3 are flow charts showing behavior procedures from start to termination of the program behavior monitoring system 1.

In step S1, when an OS is started by a start-up of the system, the distributed object creation management unit 13 which is one of the standard function blocks of the OS is started.

In step S2, the registry redirector 11 is started.

Subsequently, when the OS receives a registry access request, a creation/start request of a new child process, or a termination request from an arbitrary process, the OS constantly notifies the registry redirector 11 of the received information including a pid of the arbitrary process.

Here, a pid (process identifier) refers to identification information for uniquely identifying a process in a single computer. When the OS receives a creation/start request of a new child process from an arbitrary process, the OS notifies the registry redirector 11 of a pid of the created and started child process in addition to the pid of the arbitrary process.

Figure 6:
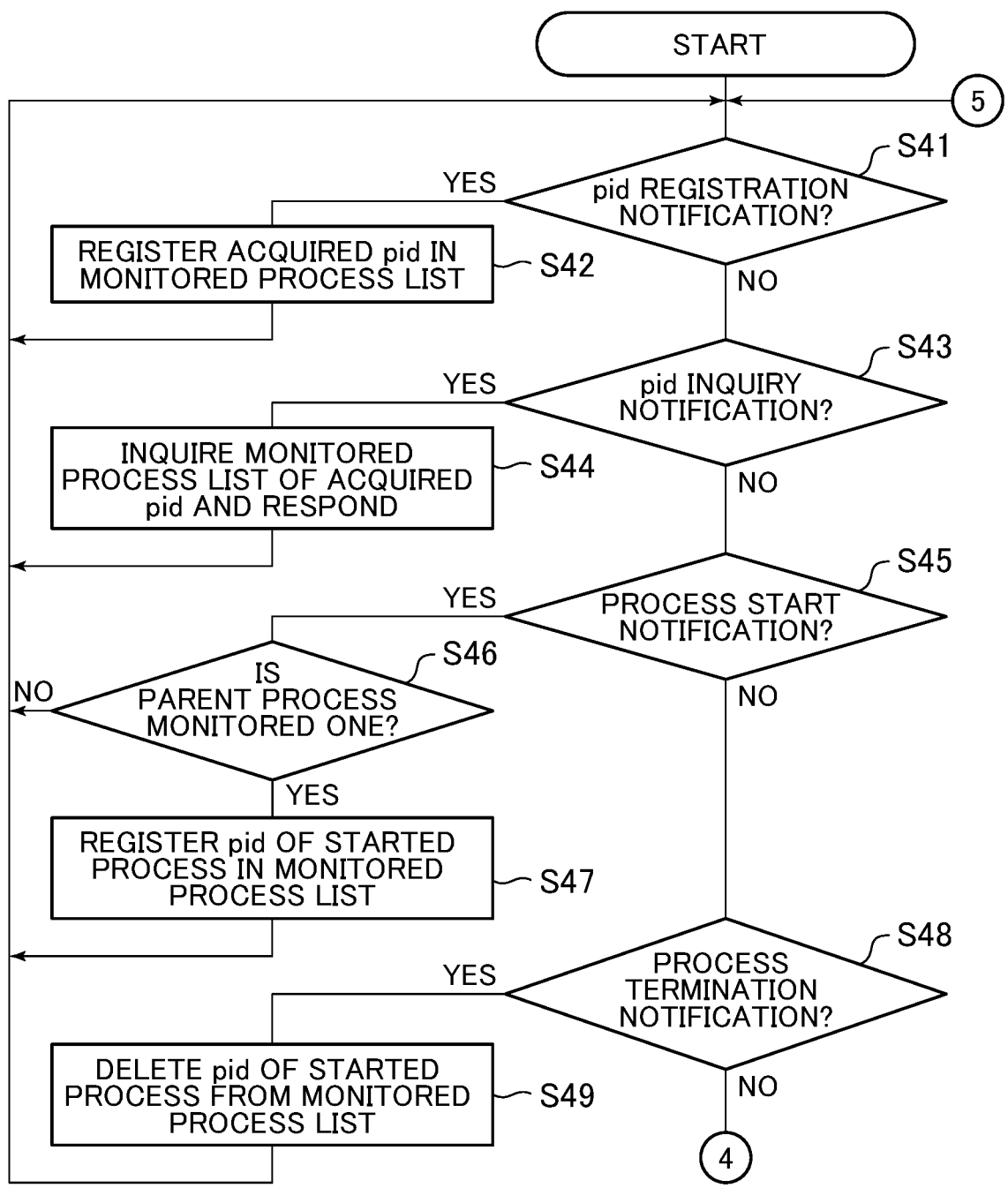
FIG. 6 is a flow chart showing a registry protection routine (pid management).

Accordingly, when a pid of a certain process is registered as a monitored one and the process creates and starts a child process, the registry redirector 11 not only receives the pid of the process but also receives the pid of the child process from the OS. As a result, the registry redirector 11 automatically registers pids of all descendant processes directly or indirectly created and started as monitored ones by the process as an origin (a root process). Specifically, as shown in FIG. 6 to be described later, a registry protection routine (pid management) is executed.

In step S3, the file system redirector 12 is started.

Subsequently, when the OS receives a file access request, a creation/start request of a new child process, or a termination request from an arbitrary process, the OS constantly notifies the file system redirector 12 of the received information including a pid of the arbitrary process.

Accordingly, when a pid of a certain process is registered as a monitored one, the file system redirector 12 automatically registers pids of all descendant processes directly or indirectly created and started as monitored ones by the process as an origin.

Furthermore, when starting of all processes in the system area is completed as a part of the OS start-up, processing advances to step S4.

In step S4, the overall control unit 20 is started in the common user area in order to provide a program behavior monitoring service as a common service to all users.

When the overall control unit 20 starts, the overall control unit 20 registers its own pid in the registry redirector 11 as a root process of all processes which are monitored ones. Accordingly, the pids of all descendant processes directly or indirectly created and started by the overall control unit 20 as an origin are automatically registered as monitored ones by the registry redirector 11 which is already started.

In addition, the overall control unit 20 issues an instruction to the OS in advance so that, when an arbitrary process is created in an individual user area, the process always internally incorporates the printing behavior monitoring unit 32P and the clipboard behavior monitoring unit 32C.

For example, when the OS is Microsoft Windows (registered trademark), the overall control unit 20 may instruct the OS in advance so that a process installs a prescribed hook procedure when the process starts.

In step S5, the overall control unit 20 determines whether or not a sign-in by a user to request a start of execution of the program behavior monitoring service is detected. The overall control unit 20 advances to step S6 when a sign-in of the user is detected but advances to step S13 when a sign-in of the user is not detected.

In step S6, in an individual user area of the user created at a log-on to the computer by the user as a trigger, the overall control unit 20 creates and starts the monitored user process creation unit 31 as its own child process.

At this point, when the overall control unit 20 starts (step S4), the overall control unit 20 has registered its own pid as a monitored process in the registry redirector 11 as a root process that serves as an origin of all processes which are monitored ones. Therefore, the pids of the monitored user process creation unit 31 that is a child process of the overall control unit 20, a monitored user process 32 created and started by the monitored user process creation unit 31 as an origin, and all descendant processes of the monitored user process 32 are also automatically registered as monitored ones by the registry redirector 11.

In addition, at the same time as the start of the monitored user process creation unit 31, a user interface of the program behavior monitoring service (a program behavior monitoring service UI) is presented to the user. Displayed on the program behavior monitoring service UI are a folder tree structure of an isolated folder to be described later, a selectable copy file in the isolated folder (blank is displayed when there is no copy file), an icon linked to a program of which behavior can be monitored, and the like. When the user selects an icon linked to a desired copy file or a desired program, the program associated with the selected icon is executed inside the sandbox and the overall control unit 20 advances to step S7 in order to monitor behavior of the monitored user process 32 as an execution entity of the program.

In step S7, the overall control unit 20 executes monitoring of process behavior. Specifically, the process behavior monitoring routine shown in FIG. 10 to be described later is executed.

In step S8, the overall control unit 20 determines whether or not a sign-out by the user having requested the execution of the program behavior monitoring service is detected. The overall control unit 20 advances to step S9 when a sign-out of the user is detected but returns to step S7 when a sign-out of the user is not detected. Therefore, the processing of step S7 is executed until a sign-out is detected.

In step S9, the overall control unit 20 executes termination processing of the program behavior monitoring service provided to the user. Specifically, the overall control unit 20 stops all monitored user processes 32 and descendant processes thereof which were created and started in the individual user area of the user.

In step S10, all copy files created and stored in a prescribed isolated folder for the user are deleted. Moreover, as will be described later, a folder tree structure constituted by copy files of original files and a folder storing each copy file is strictly reproduced in the isolated folder.

In step S11, all alternative registry keys created in a prescribed protected area for the user are deleted.

In step S12, the monitored user process creation unit 31 created and started in the individual user area for the user is stopped.

On the other hand, when there is a monitored distributed object server 21 created and started in the common user area by a usage request from a monitored user process 32 as a trigger, the monitored distributed object server 21 is not stopped at this point in order to enable the monitored distributed object server 21 to accommodate usage requests from, for example, a monitored user process 32 in an individual user area allocated to a user other than the user.

In step S13, the overall control unit 20 determines whether or not a shutdown of the system is detected. The overall control unit 20 advances to step S14 when a shutdown is detected but returns to step S5 when a shutdown is not detected.

In step S14, when there are monitored distributed object servers 21 created and started in the common user area, the overall control unit 20 stops all monitored distributed object servers 21.

In step S15, the overall control unit 20 stops. Subsequently, in step S16, the file system redirector 12 is stopped and, in step S17, the registry redirector 11 is stopped.

In step S18, all functions and the OS in the system area are stopped.

Next, specific behavior processing by the program behavior monitoring system 1 with respect to various behavior of a monitored user process 32 will be described.

Behavior of a process to be monitored in the present embodiment includes printing behavior, clipboard behavior, registry access behavior, and file access behavior. Printing behavior and clipboard behavior are respectively monitored by the printing behavior monitoring unit 32P and the clipboard behavior monitoring unit 32C having been internally incorporated into a monitored user process 32 at the time of creation and start of the monitored user process 32.

Registry access behavior and file access behavior are respectively monitored by the registry redirector 11 and the file system redirector 12 which operate in the system area.

Figure 4:
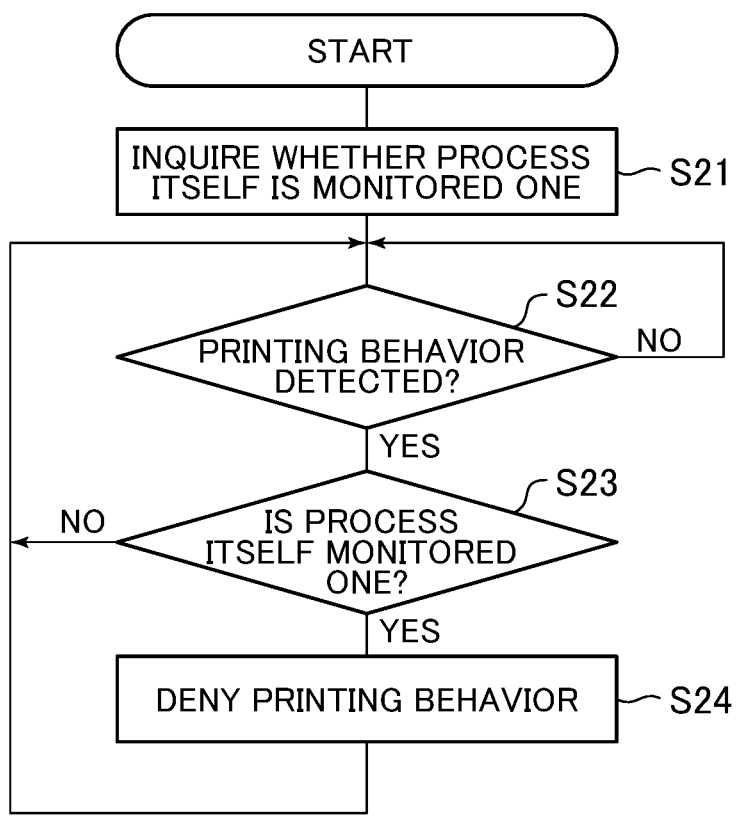
FIG. 4 is a flow chart showing a printing behavior monitoring routine.

FIG. 4 is a flow chart showing a printing behavior monitoring routine by the printing behavior monitoring unit 32P internally incorporated into a process. When an arbitrary process is started in an individual user area, the present printing behavior monitoring routine is executed inside the process.

In step S21, upon start of the process, the process (the internally-incorporated printing behavior monitoring unit 32P) inquires the overall control unit 20 as to whether the process itself is a monitored one or, specifically, whether its own pid is that of a monitored one.

In step S22, the printing behavior monitoring unit 32P determines whether or not printing behavior of the process having internally incorporated the printing behavior monitoring unit 32P itself is detected. The printing behavior monitoring unit 32P advances to step S23 when the printing behavior is detected but the printing behavior monitoring unit 32P stands by at step S22 when the printing behavior is not detected.

In step S23, based on a result of the inquiry in step S21, the printing behavior monitoring unit 32P determines whether or not the process itself is a monitored one. The printing behavior monitoring unit 32P advances to step S24 when the process itself is a monitored one but returns to step S22 when the process itself is not a monitored one.

In step S24, the printing behavior monitoring unit 32P denies the printing behavior and returns to step S22.

For example, when the OS is Microsoft Windows (registered trademark), such a printing behavior monitoring routine is implemented by using a hook which is injected into the OpenPrinter API.

Figure 5:
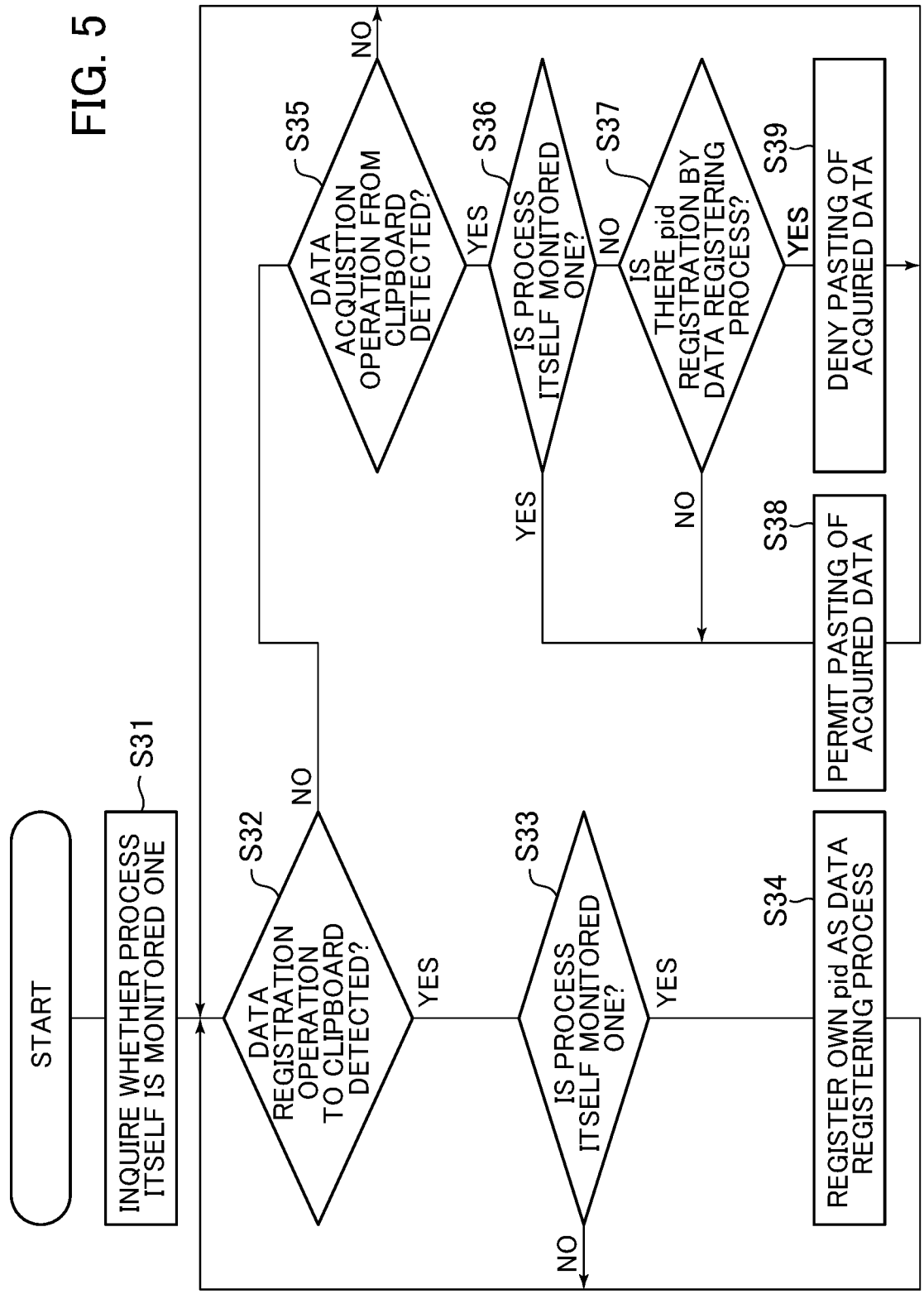
FIG. 5 is a flow chart showing a clipboard behavior monitoring routine.

FIG. 5 is a flow chart showing a clipboard behavior monitoring routine by the clipboard behavior monitoring unit 32C internally incorporated into a process. When an arbitrary process is started in an individual user area, the present clipboard behavior monitoring routine is executed inside the process.

In step S31, upon start of the process, the process (the internally-incorporated clipboard behavior monitoring unit 32C) inquires the overall control unit 20 as to whether the process itself is a monitored one or, specifically, whether its own pid is that of a monitored one.

In step S32, the clipboard behavior monitoring unit 32C determines whether or not a data registration operation to the clipboard by the process having internally incorporated the clipboard behavior monitoring unit 32C itself is detected. The clipboard behavior monitoring unit 32C advances to step S33 when the data registration operation is detected but advances to step S35 when the data registration operation is not detected.

In step S33, based on a result of the inquiry in step S31, the clipboard behavior monitoring unit 32C determines whether or not the process itself is a monitored one. The clipboard behavior monitoring unit 32C advances to step S34 when the process itself is a monitored one but returns to step S32 when the process itself is not a monitored one.

In step S34, the clipboard behavior monitoring unit 32C registers its own pid in a prescribed shared memory in order to indicate that the process itself is a data registering process.

For example, when the OS is Microsoft Windows (registered trademark), processing when such a data registration operation by the process itself is detected in the clipboard behavior monitoring routine is implemented by using a hook which is injected into the SetClipboardData API.

Meanwhile, in step S35, the clipboard behavior monitoring unit 32C determines whether or not a data acquisition operation from the clipboard by the process into which the clipboard behavior monitoring unit 32C itself is internally incorporated is detected. The clipboard behavior monitoring unit 32C advances to step S36 when the data acquisition operation is detected but returns to step S32 when the data acquisition operation is not detected.

In step S36, based on a result of the inquiry in step S31, the clipboard behavior monitoring unit 32C determines whether or not the process itself is a monitored one. The clipboard behavior monitoring unit 32C advances to step S38 when the process itself is a monitored one but advances to step S37 when the process itself is not a monitored one.

In step S37, the clipboard behavior monitoring unit 32C determines whether or not there is a pid registration of a data registering process in the shared memory described earlier. The clipboard behavior monitoring unit 32C advances to step S39 when there is a pid registration but advances to step S38 when there is no pid registration.

In step S38, the clipboard behavior monitoring unit 32C permits a paste operation of acquired data to the process itself. Subsequently, the clipboard behavior monitoring unit 32C returns to step S32.

When it is determined in step S37 that there is no pid registration, the data registering process having registered data is not a monitored one. In other words, the data acquisition operation in step S35 corresponds to an exchange of data via the clipboard between ordinary processes which are not monitored ones. Therefore, in step S38, a paste operation of acquired data to the process itself is permitted.

In step S39, the clipboard behavior monitoring unit 32C denies a paste operation of acquired data to the process itself. Subsequently, the clipboard behavior monitoring unit 32C returns to step S32.

When it is determined in step S37 that there is a pid registration, the data registering process having registered data is a monitored one. Therefore, the data acquisition operation in step S35 corresponds to migration of data from a process that is a monitored one to a process that is not a monitored one. In other words, the data acquisition operation described above is an action of moving confidential data handled by a program executed inside the sandbox to a program executed outside the sandbox. Accordingly, in step S39, a paste operation of acquired data to the process itself is denied.

For example, when the OS is Microsoft Windows (registered trademark), processing when such a data acquisition operation by the process itself is detected in the clipboard behavior monitoring routine is implemented by using a hook which is injected into the GetClipboardData API.

As described earlier, each time a new process is created and started, the registry redirector 11 receives a notification to that effect from the OS, which includes pids of the process and a parent process thereof, and uses the information in the notification.

Specifically, in the present embodiment, in addition to a primary role of registry protection, the registry redirector 11 also has a role of managing pids of all processes which are monitored ones using the notification from the OS described with reference to step S2 shown in FIG. 2.

In other words, pids of all monitored processes are managed by the registry redirector 11. Specifically, as described with reference to step S4 shown in FIG. 2, when the registry redirector 11 receives a pid registration notification from the overall control unit 20, the registry redirector 11 registers the pid, which the registration notification has included, in a monitored process list internally included in the registry redirector 11. In addition, when the registry redirector 11 receives a pid registration inquiry notification from the overall control unit 20 or the like, the registry redirector 11 responds to the inquiry from the overall control unit 20 or the like by inquiring the monitored process list of the pid, which the registration inquiry notification has included.

When the registry redirector 11 receives a notification related to new creation of a process, a registry access, or the like from the OS, or receives a registration notification or a registration inquiry notification of a pid from the overall control unit 20 or the like, the registry redirector 11 executes the registry protection routine described below.

Figure 7:
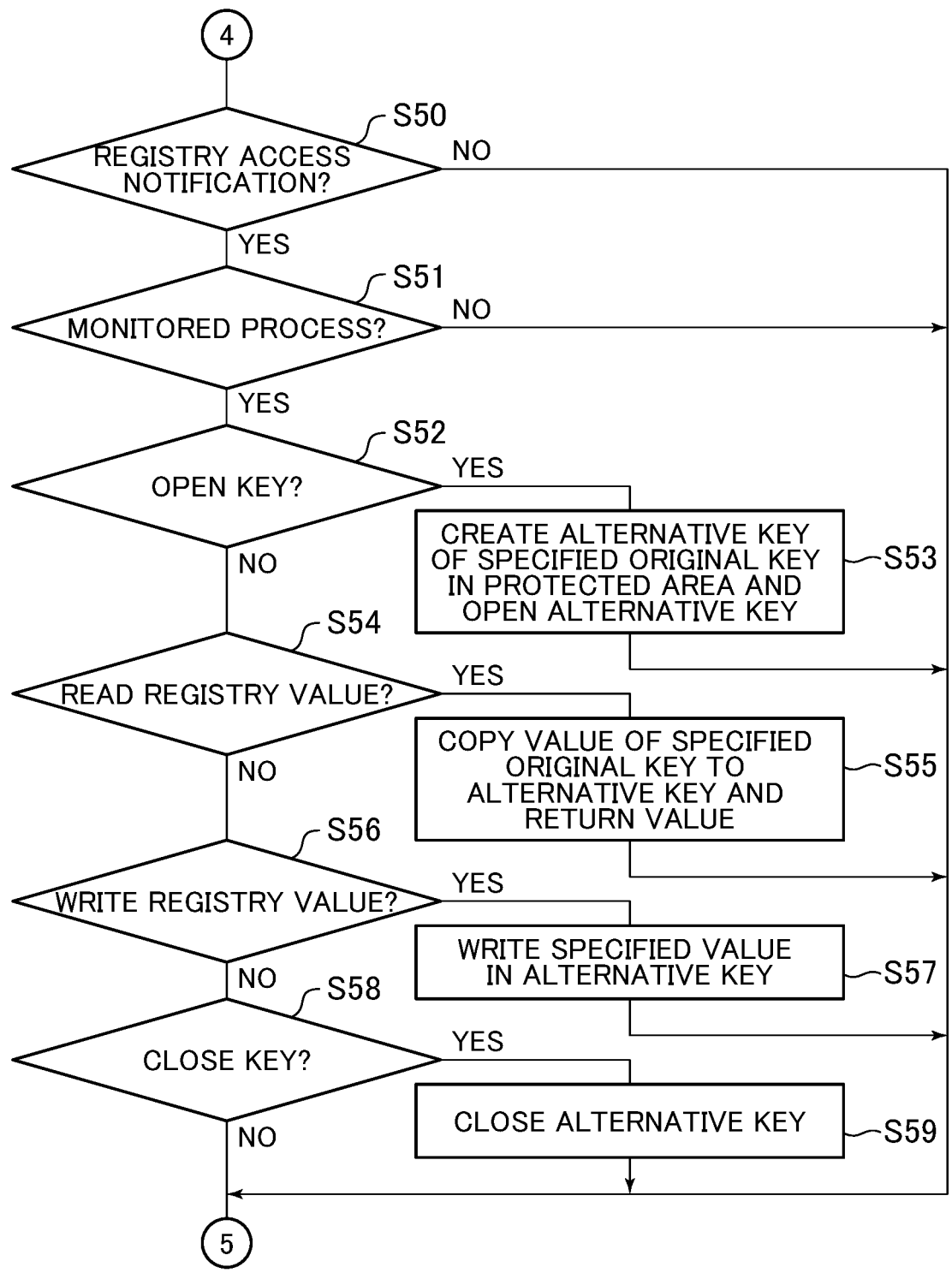
FIG. 7 is a flow chart showing a registry protection routine (registry protection).

FIGS. 6 and 7 are flow charts showing the registry protection routine performed by the registry redirector 11.

In step S41, the registry redirector 11 determines whether or not a pid registration notification is received from the overall control unit 20. The registry redirector 11 advances to step S42 when a pid registration notification is received but advances to step S43 when a pid registration notification is not received.

In step S42, the registry redirector 11 registers the pid included in the pid registration notification received from the overall control unit 20 in the monitored process list. Subsequently, the registry redirector 11 returns to step S41.

In step S43, the registry redirector 11 determines whether or not a pid inquiry notification is received from the overall control unit 20 or the like. The registry redirector 11 advances to step S44 when a pid inquiry notification is received but advances to step S45 when a pid inquiry notification is not received.

In step S44, the registry redirector 11 inquires as to whether the acquired pid is registered in the monitored process list and returns a result of the inquiry to the overall control unit 20 or the like. Subsequently, the registry redirector 11 returns to step S41.

In step S45, the registry redirector 11 determines whether or not a new creation/start notification of a process is received from the OS. The registry redirector 11 advances to step S46 when a new creation/start notification of a process is received but advances to step S48 when a new creation/start notification of a process is not received. Here, a new creation/start notification of a process includes not only a pid of a newly created and started process but also a pid of a parent process of the process.

In step S46, the registry redirector 11 determines whether or not the pid of the parent process of the process which is acquired when receiving a new creation/start notification of the process from the OS is registered in the monitored process list or, in other words, whether or not the parent process is a monitored one. The registry redirector 11 advances to step S47 when the parent process is a monitored one but returns to step S41 when the parent process is not a monitored one.

In step S47, the registry redirector 11 registers the pid of the newly created and started process in the monitored process list. Subsequently, the registry redirector 11 returns to step S41. In this manner, when a parent process of a newly created and started process is a monitored one, since the process must also be made as a monitored one, the pid of the process is also registered in the monitored process list.

As a result, due to the overall control unit 20 registering its own pid in the registry redirector 11 upon start of the overall control unit 20 (step S4 shown in FIG. 2), all of the processes (descendant processes) directly or indirectly created by the overall control unit 20 as an origin are registered in the monitored process list.

More specifically, (1) to (4) below correspond to all processes which are registered in the monitored process list.

(1) The overall control unit 20

(2) The monitored user process creation unit 31 created and started as a child process of the overall control unit 20

(3) A monitored user process 32 created and started as a child process of the monitored user process creation unit 31 when the user specifies execution of a desired program in the sandbox, as well as descendant processes of the monitored user process 32

(4) A monitored distributed object server 21 created and started by the monitored distributed object server creation unit 20G inside the overall control unit 20 as a child process of the overall control unit 20, as well as descendant processes of the monitored distributed object server 21

In step S48, the registry redirector 11 determines whether or not a process termination notification is received from the OS. The registry redirector 11 advances to step S49 when a process termination notification is received but advances to step S50 when a process termination notification is not received.

In step S49, the registry redirector 11 acquires a pid of the process included in the process termination notification and, using the pid, deletes a pid of the terminated process from the monitored process list. Subsequently, the registry redirector 11 returns to step S41.

Processing for registry protection is executed in steps S50 and thereafter.

In step S50, the registry redirector 11 determines whether or not a registry access notification is received from the OS. A registry access notification refers to a notification that is always sent from the OS every time an arbitrary process attempts to access the registry. Moreover, a registry access notification includes a pid of the process attempting to access the registry and access contents of the process. The registry redirector 11 advances to step S51 when a registry access notification is received but returns to step S41 when a registry access notification is not received.

In step S51, using a pid of a process acquired from the registry access notification, the registry redirector 11 inquires a monitored process list retained by the registry redirector 11 itself and determines whether or not the process attempting to access the registry is a monitored one. The registry redirector 11 advances to step S52 when the process is a monitored one but returns to step S41 when the process is not a monitored one.

Accordingly, every time a monitored user process 32 attempts to access the registry, the registry redirector 11 executes processing of subsequent steps S52 and thereafter in order to protect the registry.

In step S52, based on a notification received from the OS, the registry redirector 11 determines whether or not a registry open operation is detected. The registry redirector 11 advances to step S53 when a registry open operation is detected but advances to step S54 when a registry open operation is not detected.

In step S53, the registry redirector 11 creates an alternative registry key to be a substitute of a specified original key in a prescribed protected area and opens the alternative registry key. Subsequently, the registry redirector 11 returns to step S41.

In step S54, based on a notification received from the OS, the registry redirector 11 determines whether or not a registry read operation is detected. The registry redirector 11 advances to step S55 when a registry read operation is detected but advances to step S56 when a registry read operation is not detected.

In step S55, the registry redirector 11 copies a value of the specified original key to the alternative registry key (already created when accommodating the registry open operation described earlier) and returns the value. Subsequently, the registry redirector 11 returns to step S41.

In step S56, based on a notification received from the OS, the registry redirector 11 determines whether or not a registry write operation is detected. The registry redirector 11 advances to step S57 when a registry write operation is detected but advances to step S58 when a registry write operation is not detected.

In step S57, the registry redirector 11 writes a specified value in the alternative registry key (already created when accommodating the registry open operation described earlier). Subsequently, the registry redirector 11 returns to step S41.

In step S58, based on a notification received from the OS, the registry redirector 11 determines whether or not a registry close operation is detected. The registry redirector 11 advances to step S59 when a registry close operation is detected but returns to step S41 when a registry close operation is not detected.

In step S59, the registry redirector 11 closes the alternative registry key (already created when accommodating the registry open operation described earlier). Subsequently, the registry redirector 11 returns to step S41.

As already described earlier, alternative registry keys created in a prescribed protected area are all deleted after detection of a sign-out by the user (step S11 in FIG. 3).

Figure 8:
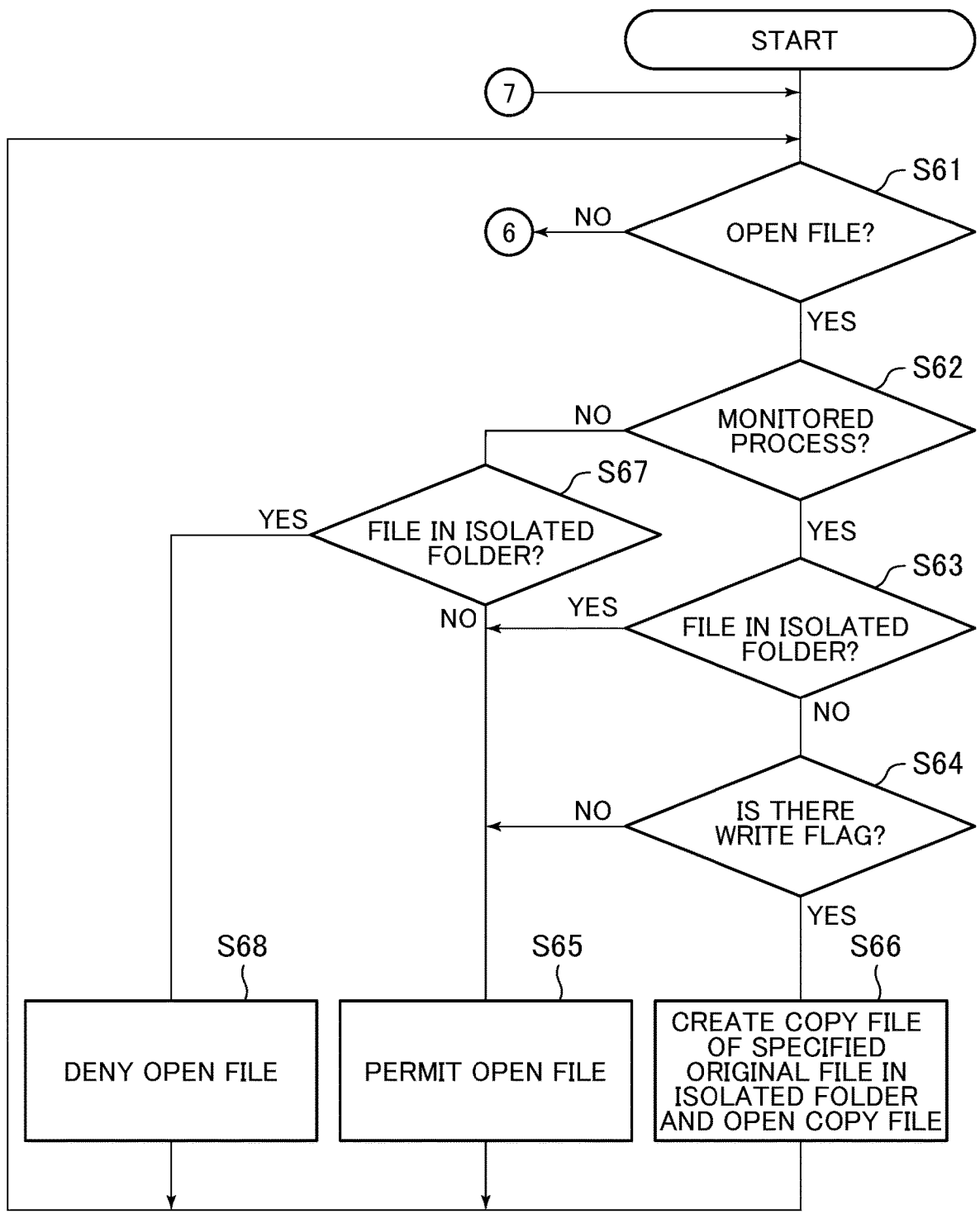
FIG. 8 is a flow chart showing a file protection routine (for a file opening operation and the like).
Figure 9:
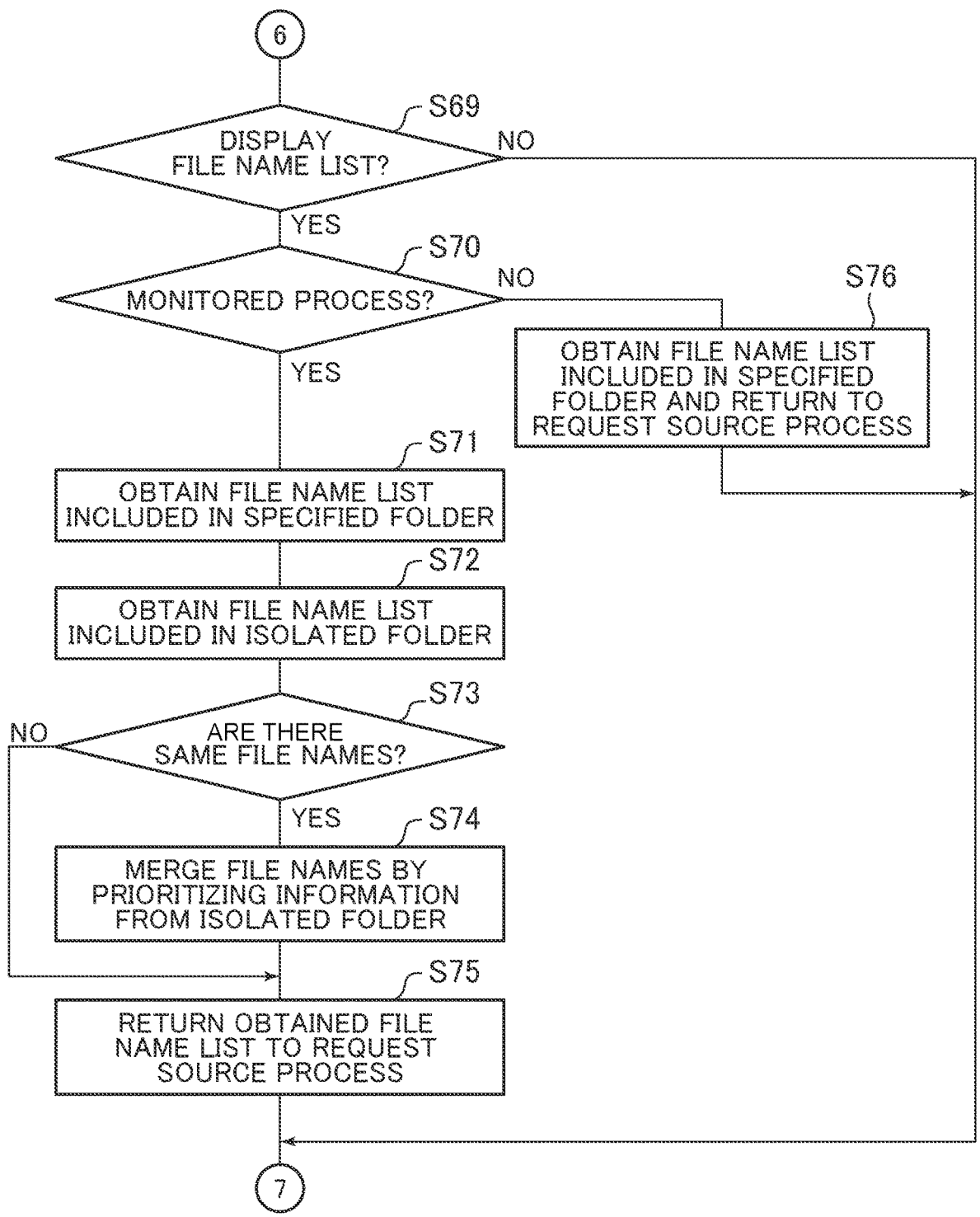
FIG. 9 is a flow chart showing a file protection routine (for a file name list display).

FIGS. 8 and 9 are flow charts showing a file protection routine performed by the file system redirector 12.

Every time an arbitrary process attempts to open a file or a request to display a list of names of files included in an arbitrary folder is made, the file system redirector 12 receives a notification (including a pid of the process) indicating the operations from the OS and executes the file protection routine described below.

Note that, while details will be omitted, the file system redirector 12 can also be configured to manage a pid of a monitored process in a similar manner to the registry redirector 11.

In step S61, the file system redirector 12 receives a notification from the OS and determines whether or not a file open operation is detected. The file system redirector 12 advances to step S62 when a file open operation is detected but advances to step S69 when a file open operation is not detected.

In step S62, the file system redirector 12 determines whether or not a process attempting to open a file is a monitored one. Here, using a pid included in a notification received from the OS, the file system redirector 12 directly inquires the registry redirector 11 instead of the overall control unit 20.

The reason the file system redirector 12 directly inquires the registry redirector 11 is as follows. Since the registry redirector 11 and the file system redirector 12 both exist in the system area, with respect to whether or not a certain process is a monitored one, it is more efficient for the file system redirector 12 to directly inquire the registry redirector 11 than inquiring the registry redirector 11 via the overall control unit 20 which exists in a different area (the common user area).

As described earlier, the file system redirector 12 can also be configured to manage a pid of a monitored process in a similar manner to the registry redirector 11. In this case, the file system redirector 12 may inquire a monitored process list retained by the file system redirector 12 itself.

In step S63, based on a notification received from the OS, the file system redirector 12 determines whether or not a process is attempting to open a file in an isolated folder. The file system redirector 12 advances to step S65 when an attempt is made to open a file in an isolated folder but advances to step S64 when an attempt is made to open a file other than a file in an isolated folder.

In step S64, the file system redirector 12 determines whether or not there is a write flag in the notification received from the OS. A write flag refers to a flag which permits editing of contents of an object file at a file open operation. The file system redirector 12 advances to step S66 when there is a write flag but advances to step S65 when there is no write flag.

In step S65, the file system redirector 12 permits a file open operation by the process. Subsequently, the file system redirector 12 returns to step S61.

In other words, a file open operation is permitted when a monitored process (a positive determination in step S62) attempts to open a file in an isolated folder (a positive determination in step S63), or when an attempt is made to simply read (a negative determination in step S64), instead of editing contents of, a file (an existing ordinary file) other than a file in an isolated folder (a negative determination in step S63).

In step S66, the file system redirector 12 creates a copy file of a specified original file in an isolated folder and opens the copy file in the isolated folder. Accordingly, editing operations with respect to the copy file in the isolated folder can be performed. Subsequently, the file system redirector 12 returns to step S61.

In step S67, based on a notification received from the OS, the file system redirector 12 determines whether or not a process that is not a monitored one is attempting to open a file in an isolated folder. The file system redirector 12 advances to step S68 when an attempt is made to open a file in an isolated folder but advances to step S65 when an attempt is made to open a file other than a file in an isolated folder.

When a process that is not a monitored one is attempting to open a file other than a file in an isolated folder, an ordinary file operation is being performed. Therefore, opening of the file is permitted (step S65).

In step S68, the file system redirector 12 denies a file open operation. In other words, when a process that is not a monitored one attempts to open a file in an isolated folder, a file open operation is denied. Subsequently, the file system redirector 12 returns to step S61.

In step S69, based on a notification received from the OS, the file system redirector 12 determines whether or not a request for displaying a name list of files included in a prescribed folder is detected. The file system redirector 12 advances to step S70 when a file name list display request is detected but returns to step S61 when a file name list display request is not detected.

In step S70, the file system redirector 12 determines whether or not a process requesting file name list display is a monitored one. At this point, similar processing to that of step S62 is performed. Subsequently, the file system redirector 12 advances to step S71 when the process is a monitored one but advances to step S76 when the process is not a monitored one.

In step S71, the file system redirector 12 obtains a list of names of files (a first file name list) included in a folder specified by the process described above.

In step S72, the file system redirector 12 obtains a list of names of files (a second file name list) included in an isolated folder.

In step S73, the file system redirector 12 compares the first file name list and the second file name list with each other and determines whether or not there are same file names. The file system redirector 12 advances to step S74 when there are same file names but advances to step S75 when there are no same file names.

In step S74, using the first file name list as a basis, the file system redirector 12 preferentially overwrites the first file name list with relevant information of a same file name in the second file name list obtained from the isolated folder. In this manner, the file system redirector 12 merges the first file name list and the second file name list with each other.

In step S75, the file system redirector 12 returns the merged file name list to a request source process. Subsequently, the file system redirector 12 returns to step S61.

As described above, a folder tree structure constituted by copy files of original files and a folder storing each copy file is strictly reproduced inside the isolated folder. Therefore, in the comparison of the file name lists, names of files in the specified folder and names of files in the isolated folder are compared with each other with the exception of a portion of a root folder name in the isolated folder.

For example, when an original file in the specified folder is "¥¥mydocument¥memo.txt" and a copy file inside the isolated folder corresponding to the original file is "..¥isolatedfolder¥mydocument¥memo.txt", the portion of "..¥isolatedfolder", which represents the root folder name of the isolated folder, is excluded and the file names are compared with each other.

Accordingly, when the monitored process specifies an original file in an arbitrary folder for the purpose of editing contents thereof, in reality, the copy file in the isolated folder corresponding to the original file is specified as a substitute file of the original file. Subsequently, the copy file is opened and edited.

Note that, in the present embodiment, after a monitored process executes a file open operation, editing of contents by the monitored process itself including a file close operation is made excluded from monitoring.

In addition, copy files created in an isolated folder by the present routine are all deleted after detection of a sign-out by the user (step S10 in FIG. 3).

Figure 10:
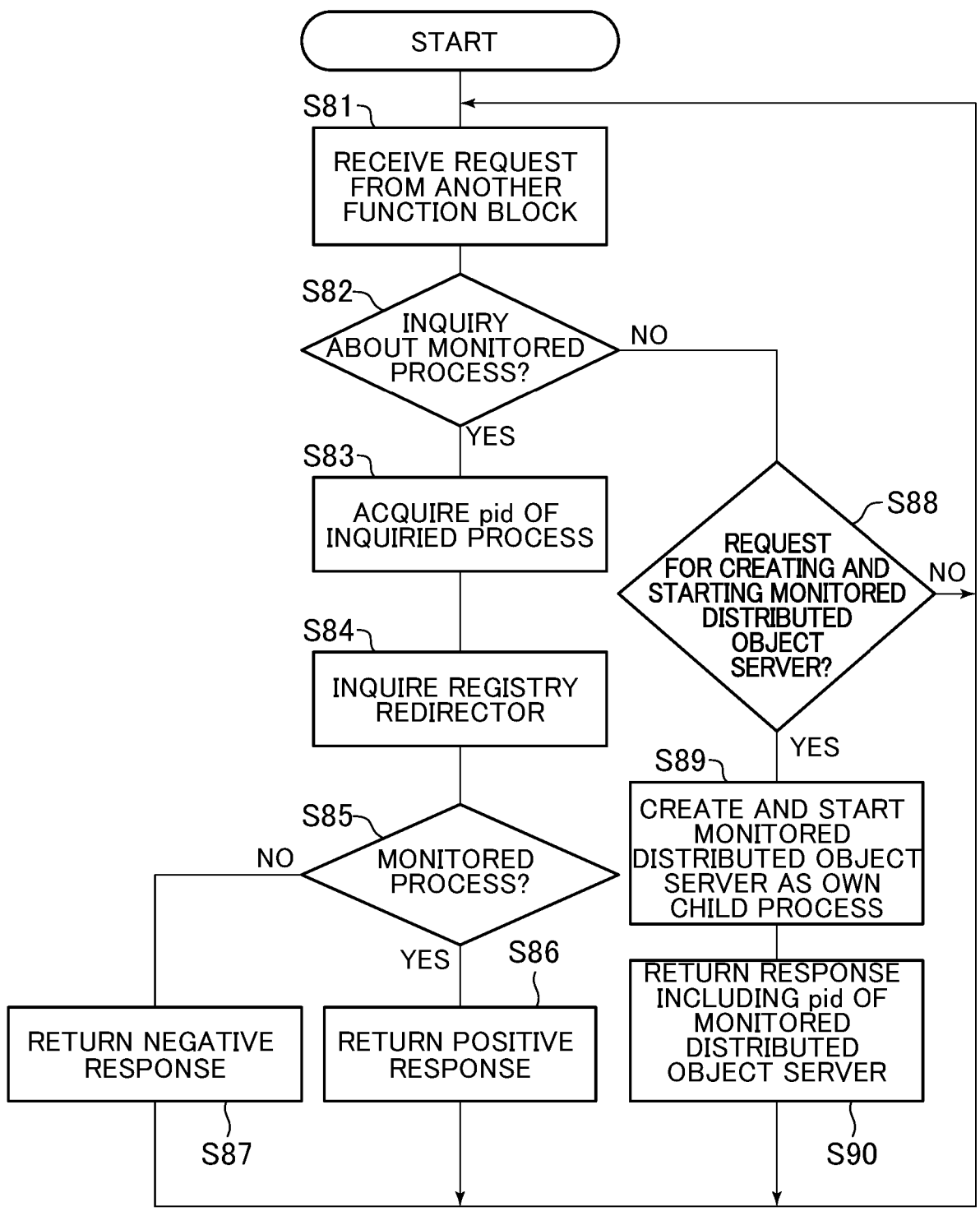
FIG. 10 is a flow chart showing a process behavior monitoring routine.

FIG. 10 is a flow chart showing a process behavior monitoring routine performed by the overall control unit 20. In the process behavior monitoring routine, inquiry of a monitored process (steps S81 to S87) and creation and start of a monitored distributed object server (steps S88 to S90) are performed.

In step S81, the overall control unit 20 receives a request from another function block (an arbitrary process). For example, when a given process is newly created and started, the process inquires the overall control unit 20 to check whether or not the process itself is a monitored one. In addition, as will be described later, when the distributed object creation management unit 13 receives a creation request of a distributed object server from a monitored user process 32, the distributed object creation management unit 13 issues a request to the overall control unit 20 to create the requested distributed object server as a monitored process (a monitored distributed object server 21).

In step S82, the overall control unit 20 determines whether or not the received request is an inquiry about a monitored process. The overall control unit 20 advances to step S83 when the request is an inquiry about a monitored process but advances to step S88 when the request is not an inquiry about a monitored process.

In step S83, the overall control unit 20 acquires a pid of a process, for which the inquiry was made, from the received request.

In step S84, the overall control unit 20 inquires the registry redirector 11 using the acquired pid.

In step S85, the overall control unit 20 receives a response to the inquiry as to whether or not the process for which the inquiry was made is a monitored one from the registry redirector 11. The overall control unit 20 advances to step S86 when the process for which the inquiry was made is a monitored one but advances to step S87 when the process is not a monitored one.

In step S86, the overall control unit 20 returns, to the process for which the inquiry was made, a positive response to the effect that the process is a monitored one. Subsequently, the overall control unit 20 returns to step S81.

In step S87, the overall control unit 20 returns, to the process for which the inquiry was made, a negative response to the effect that the process is not a monitored one. Subsequently, the overall control unit 20 returns to step S81.

On the other hand, in step S88, the overall control unit 20 determines whether or not the request received in step S81 is a request from the distributed object creation management unit 13 to create and start a monitored distributed object server 21. The overall control unit 20 advances to step S89 when the request is for creating and starting a monitored distributed object server 21 but returns to step S81 when the request is not for creating and starting a monitored distributed object server 21.

In step S89, the overall control unit 20 causes the monitored distributed object server creation unit 20G internally included in the overall control unit 20 itself to execute the following processing. Specifically, the monitored distributed object server creation unit 20G creates and starts the requested monitored distributed object server 21 as its own child process.

In step S90, the overall control unit 20 returns a pid of the requested monitored distributed object server 21 created and started by the monitored distributed object server creation unit 20G to the distributed object creation management unit 13 of a request source. Subsequently, the overall control unit 20 once again returns to step S81.

As a part of ordinary behavior, the distributed object creation management unit 13 manages pids of all distributed object servers regardless of whether or not the distributed object servers are monitored processes. Therefore, even when a monitored distributed object server 21 is created and started by the overall control unit 20, the distributed object creation management unit 13 must still manage the pid of the monitored distributed object server 21.

To this end, the overall control unit 20 notifies the distributed object creation management unit 13 of the pid of the requested monitored distributed object server 21 being created and started and causes the distributed object creation management unit 13 to register the pid. Accordingly, the distributed object creation management unit 13 is capable of constantly managing pids of all distributed object servers regardless of whether or not the distributed object servers are monitored processes.

Here, the overall control unit 20 that is a parent process of a monitored distributed object server 21 is registered in the registry redirector 11 as a monitored process. Therefore, as a result of execution of the process behavior monitoring routine shown in FIG. 10, a monitored distributed object server 21 that is a child process of the overall control unit 20 and all descendant processes directly or indirectly created and started by the monitored distributed object server 21 as an origin are also automatically registered as monitored processes in the registry redirector 11.

Next, an outline of processing procedures when a monitored user process 32 makes a usage request of a desired distributed object server to the distributed object creation management unit 13 will be described.

Figure 11:
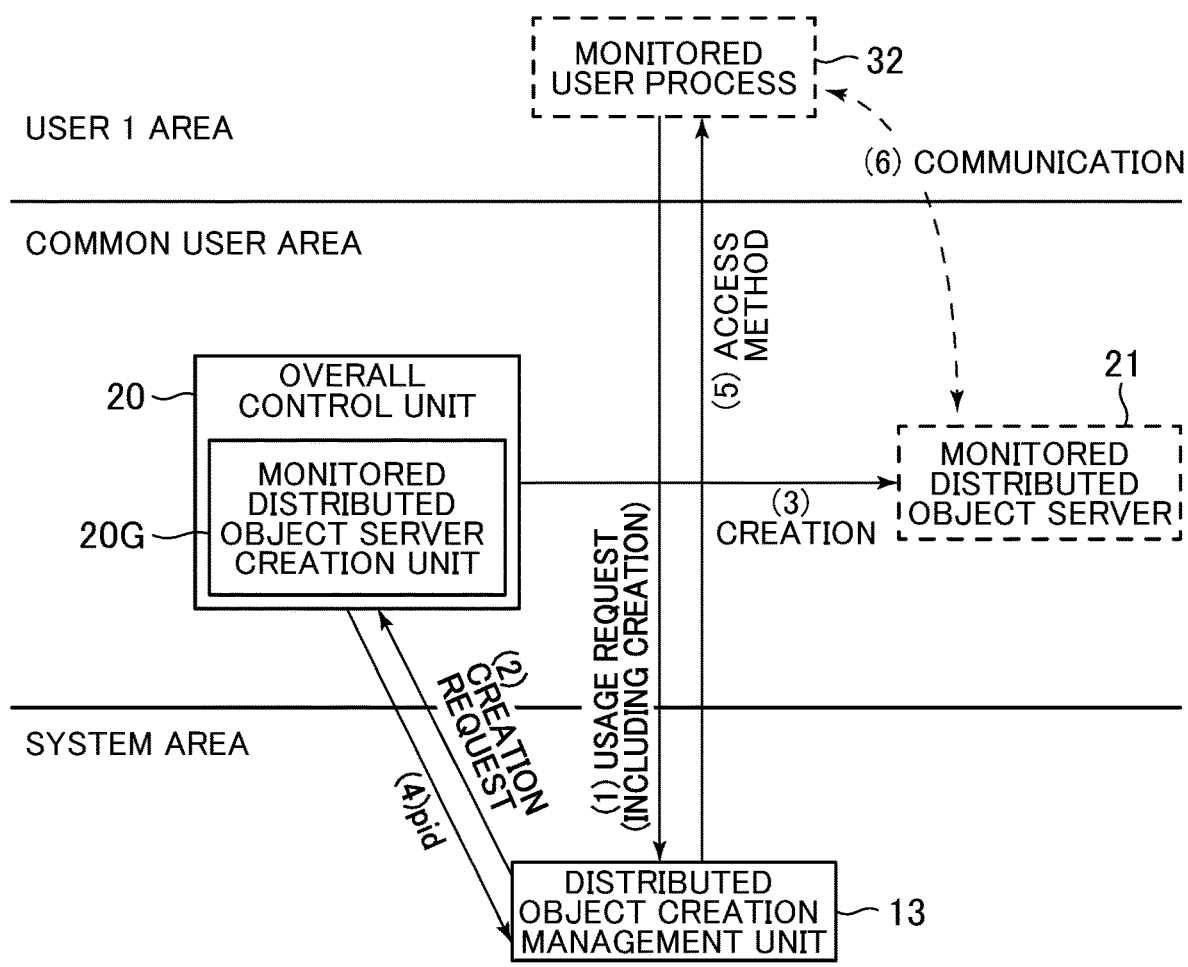
FIG. 11 is a block diagram showing substantial parts of a program behavior monitoring system.

FIG. 11 is a block diagram showing substantial parts of the program behavior monitoring system 1. In FIG. 11, processing is executed in sequence from (1) to (6).

(1) An arbitrary monitored user process 32 sends a usage request of a desired monitored distributed object server 21 to the distributed object creation management unit 13.

(2) When the usage request source process is a monitored one, the distributed object creation management unit 13 requests creation and start of the requested monitored distributed object server 21 for which the usage request was made by issuing a prescribed notification (including a notification of a start method with an execution object file, execution authority, and the like) to the overall control unit 20.

(3) Upon receiving the request from the distributed object creation management unit 13, the overall control unit 20 creates and starts a distributed object server for which the usage request was made as a monitored distributed object server 21 using the monitored distributed object server creation unit 20G internally included in the overall control unit 20.

(4) The overall control unit 20 returns a pid of the requested monitored distributed object server 21 being created and started as a response to the distributed object creation management unit 13.

(5) The distributed object creation management unit 13 returns a response including an access method to the created and started monitored distributed object server 21 to the usage request source process.

(6) The monitored user process 32 (the usage request source process) communicates with the requested monitored distributed object server 21 based on the access method to the monitored distributed object server 21 received from the distributed object creation management unit 13.

Next, specific processing procedures when a monitored user process 32 makes a usage request of a desired distributed object server to the distributed object creation management unit 13 will be described. Specifically, specific processing performed by the distributed object creation management unit 13 with respect to (1), (2), (4), and (5) in FIG. 11 will be described.

Figure 12:
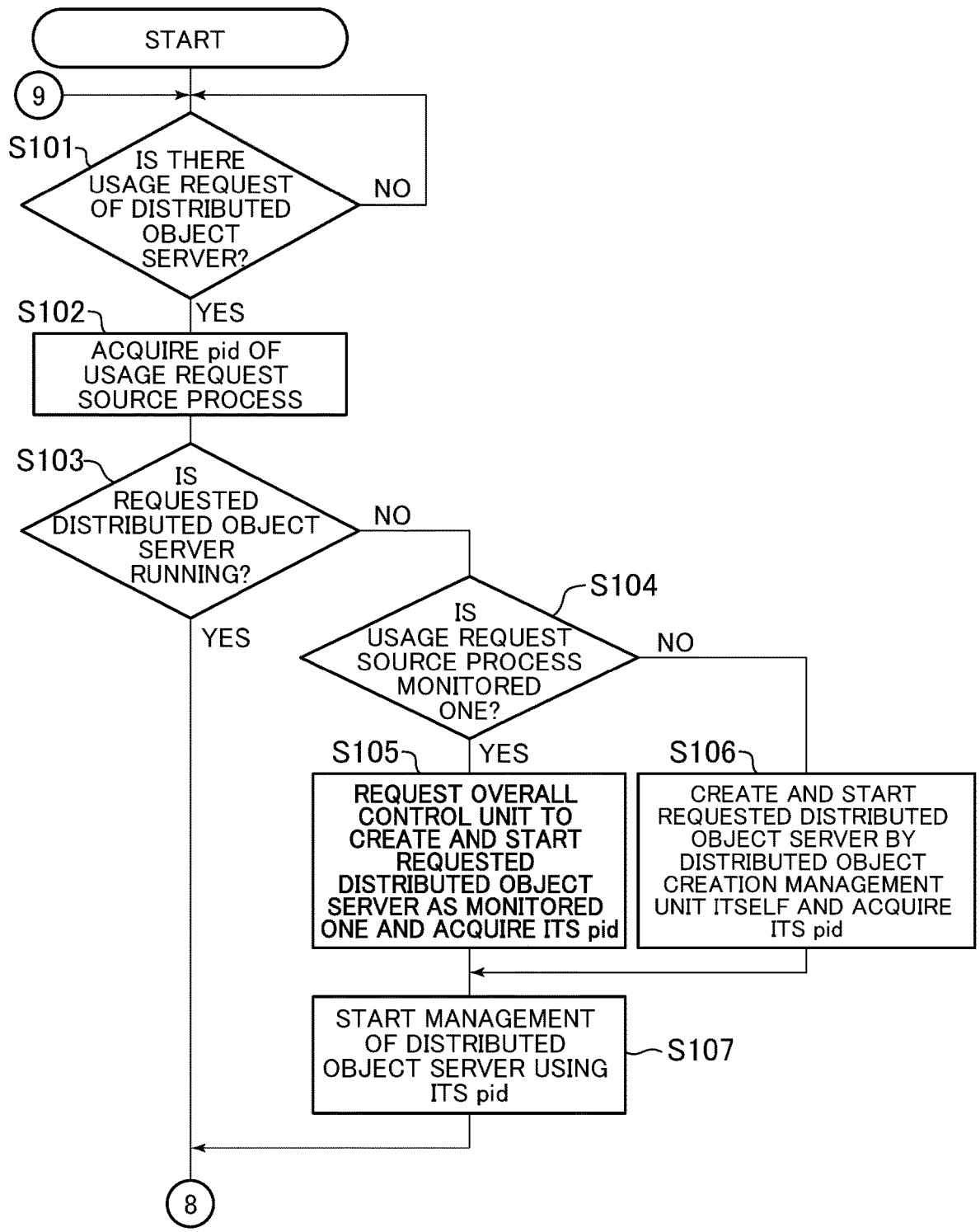
FIG. 12 is a flow chart showing a distributed object server creation management routine.
Figure 13:
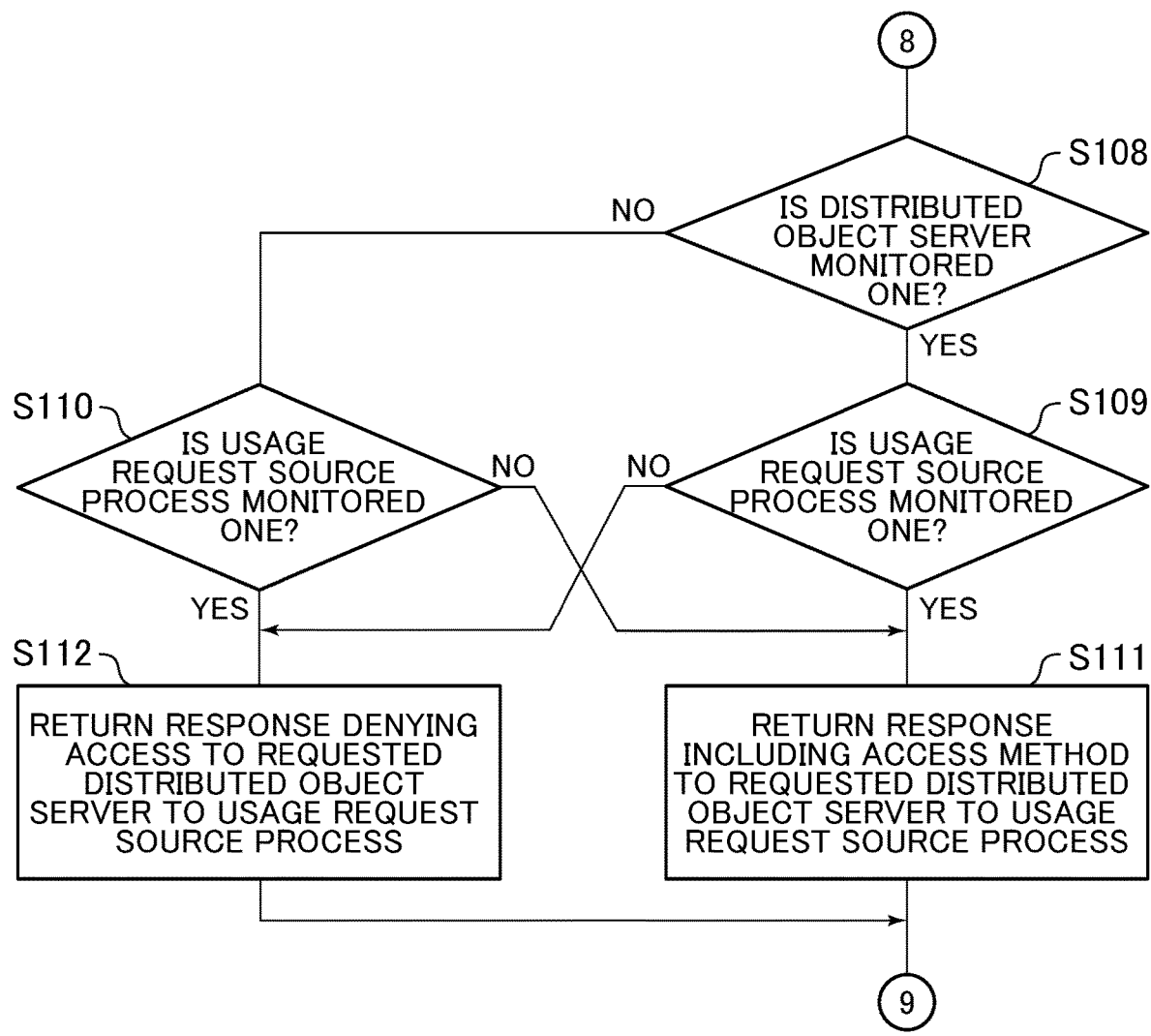
FIG. 13 is a flow chart showing a distributed object server creation management routine.

FIGS. 12 and 13 are flow charts showing a distributed object server creation management routine performed by the distributed object creation management unit 13.

In step S101, the distributed object creation management unit 13 determines whether or not there is a usage request of a desired distributed object server from an arbitrary process. The distributed object creation management unit 13 advances to step S102 when there is a usage request but stands by in step S101 when there is no usage request.

In step S102, upon receiving the usage request of the desired distributed object server, the distributed object creation management unit 13 acquires a pid of the usage request source process (a pid included in the usage request).

In step S103, the distributed object creation management unit 13 determines whether or not the requested distributed object server is running. The distributed object creation management unit 13 advances to step S108 when the requested distributed object server is running but advances to step S104 when the requested distributed object server is not running.

In step S104, the distributed object creation management unit 13 directly inquires the registry redirector 11 using the acquired pid and determines whether or not the usage request source process is a monitored one. The distributed object creation management unit 13 advances to step S105 when the process is a monitored one but advances to step S106 when the process is not a monitored one.

The registry redirector 11 and the distributed object creation management unit 13 both exist in the system area. Therefore, the distributed object creation management unit 13 is capable of directly inquiring the registry redirector 11 without involving the overall control unit 20 which exists in the common user area.

In step S105, the distributed object creation management unit 13 makes a request to the overall control unit 20 to create and start the requested monitored distributed object server 21.

Upon receiving the request from the distributed object creation management unit 13, the overall control unit 20 causes the monitored distributed object server creation unit 20G internally included in the overall control unit 20 itself to execute the following processing.

Specifically, the monitored distributed object server creation unit 20G creates and starts the requested monitored distributed object server 21 as its own child process (step S89 in FIG. 10). In addition, the overall control unit 20 notifies the distributed object creation management unit 13 of a pid of the requested monitored distributed object server 21 created and started as its own child process (step S90).

Furthermore, the distributed object creation management unit 13 receives the pid of the requested monitored distributed object server 21 from the overall control unit 20 and advances to step S107.

In step S106, the distributed object creation management unit 13 creates and starts the requested distributed object server as its own child process, which is not a monitored one, and acquires a pid of the requested distributed object server.

In step S107, the distributed object creation management unit 13 starts management of the newly created and started distributed object server using the acquired pid.

In step S108, the distributed object creation management unit 13 determines whether or not the requested distributed object server which is currently running is a monitored process. Up to this point, when the requested distributed object server is a monitored process, the distributed object creation management unit 13 has acquired a pid of the requested distributed object server from the overall control unit 20 (step S105) and, when the requested distributed object server is not a monitored process, the distributed object creation management unit 13 itself has created and started the requested distributed object server and acquired a pid thereof (step S106).

Accordingly, the distributed object creation management unit 13 can by itself determine, based on an acquisition method of a pid of a running distributed object server, whether or not the requested distributed object server is a monitored process, without having to inquire the overall control unit 20 or the registry redirector 11 of the pid. In other words, the distributed object creation management unit 13 is equipped with a function of retaining a result of this determination and may determine whether or not the requested distributed object server is a monitored process using this function.

When the distributed object creation management unit 13 is not equipped with a function of retaining a result of a determination as to whether or not a distributed object server currently running is a monitored process, the distributed object creation management unit 13 may identify a pid of the currently-running requested distributed object server managed by the distributed object creation management unit 13 itself and, by directly inquiring the registry redirector 11 of the pid, determine whether or not the currently-running requested distributed object server is a monitored process. Subsequently, the distributed object creation management unit 13 advances to step S109 when the currently-running requested distributed object server is a monitored one but advances to step S110 when the currently-running requested distributed object server is not a monitored one.

In step S109, the distributed object creation management unit 13 directly inquires the registry redirector 11 using the pid of the usage request source process acquired in step S102 and determines whether or not the usage request source process is a monitored one. The distributed object creation management unit 13 advances to step S111 when the usage request source process is a monitored one but advances to step S112 when the usage request source process is not a monitored one.

In step S110, the distributed object creation management unit 13 determines whether or not the usage request source process is a monitored one in a similar manner to step S109. The distributed object creation management unit 13 advances to step S112 when the usage request source process is a monitored one but advances to step S111 when the usage request source process is not a monitored one.

In step S111, either state 1 or state 2 described below exists.

(State 1) A desired distributed object server is a monitored process (a desired monitored distributed object server 21) and, in addition, a usage request source process thereof is also a monitored one (a monitored user process 32). In this case, even when the monitored user process 32 that is a usage request source accesses the desired monitored distributed object server 21, no problems occur since the monitored user process 32 and the desired monitored distributed object server 21 are both monitored processes.

(State 2) A desired distributed object server is not a monitored process and, in addition, a usage request source process thereof is also not a monitored one. Since this is an ordinary operation and, in this case, since the usage request source process and the desired distributed object server are both excluded from the monitored processes, no problems occur even when the usage request source accesses the desired distributed object server.

In consideration thereof, the distributed object creation management unit 13 returns a response including an access method to the requested distributed object server to the usage request source process. Subsequently, the distributed object creation management unit 13 once again returns to step S101.

On the other hand, when a desired distributed object server is not running (a negative determination in step S103), processing of steps S104 to S107 is executed and the requested distributed object server is created and started. In this case, if the usage request source process is a monitored one, the requested distributed object server being created is also a monitored process (a monitored distributed object server 21). On the other hand, if the usage request source process is not a monitored one (in other word, if the usage request source process is an ordinary process), the requested distributed object server being created and started is also not a monitored process.

Therefore, when the requested distributed object server is newly created and started by the processing in steps S104 to S107 in response to a usage request by a usage request source process, either positive determinations are made in both steps S108 and S109 or negative determinations are made in both steps S108 and S110. As a result, the distributed object creation management unit 13 always permits a usage request of the desired distributed object server by the usage request source process and returns a response including an access method to the requested distributed object server (step S111).

In step S112, either state 3 or state 4 described below exists.

(State 3) Although a desired distributed object server is a monitored process (a desired monitored distributed object server 21), a usage request source process thereof is not a monitored one.

(State 4) Although a desired distributed object server is not a monitored process, a usage request source process thereof is a monitored one (a monitored user process 32).

A situation of state 3 or state 4 may occur when a distributed object server requested by a certain process is already running based on a usage request from a process of another user (a positive determination in step S103) and the processing of steps S104 and S107 is not executed. In other words, when the process of the other user is not a monitored one, the requested distributed object server which is currently running is also not a monitored process. Therefore, if a usage request source process is a monitored one (a monitored user process 32), the situation of state 4 occurs.

In such a situation, if access from the usage request source process to the requested distributed object server is to be permitted, an omission of monitoring of program behavior of either one of the usage request source process and the requested distributed object server occurs.

In consideration thereof, in step S112, the distributed object creation management unit 13 returns a response denying access to the requested distributed object server to the usage request source process. Subsequently, the distributed object creation management unit 13 once again returns to step S101.

Here, in order to solve the access denial response shown in step S112, the requested distributed object server which is currently running must be temporarily stopped and, subsequently, the requested distributed object server must be restarted in the same monitoring situation (whether or not the requested distributed object server is a monitored process) as the usage request source process. The reason for this is as follows.

The registry redirector 11 and the file system redirector 12 perform a special protection operation when a monitored distributed object server 21 exists (refer to FIGS. 6 to 9). Accordingly, if the requested distributed object server which is running is changed from a non-monitored process to a monitored one without being stopped, the special protection operation can no longer be maintained while retaining consistency. In other words, since a change from a non-monitored process to a monitored process must be performed when the requested distributed object server is not running, the processing described above must be performed.

In addition, if the requested distributed object server which is running is changed from a monitored process to a non-monitored one without being stopped, there is a risk that a problem may occur with respect to handling of files by the requested distributed object server. For example, when the requested monitored distributed object server 21 newly creates a file, the file is placed only in an isolated folder. However, if the requested monitored distributed object server 21 is changed to a non-monitored process without being stopped, the requested distributed object server can no longer access the newly-created file which is in the isolated folder. In order to avoid such problems, when changing a monitoring situation of the requested distributed object server, the requested distributed object server must be temporarily stopped and, subsequently, the requested distributed object server after changing the monitoring situation thereof must be restarted from the beginning.

[Modification]

The description thus far is premised on a requested distributed object server being created and started only as a single process. Hereinafter, a case where the requested distributed object server can be created and started as a plurality of processes will be assumed. The distributed object creation management unit 13 may also individually manage a monitoring situation of each of a plurality of distributed object servers (whether or not each distributed object server is a monitored process) and, when there is a usage request of a desired distributed object server from a usage request source process, select the requested distributed object server in the same monitoring situation as the usage request source process and return a response including an access method to the requested distributed object server to the request source process.

The distributed object creation management unit 13 is originally provided as one of the standard function blocks of an OS. In consideration thereof, in order to minimize alterations from standard functions of the OS, the usage request source process itself may directly determine whether or not a desired distributed object server is running including a monitoring situation of the desired distributed object server. In this case, the distributed object creation management unit 13 simply needs to execute the following routine.

Figure 14:
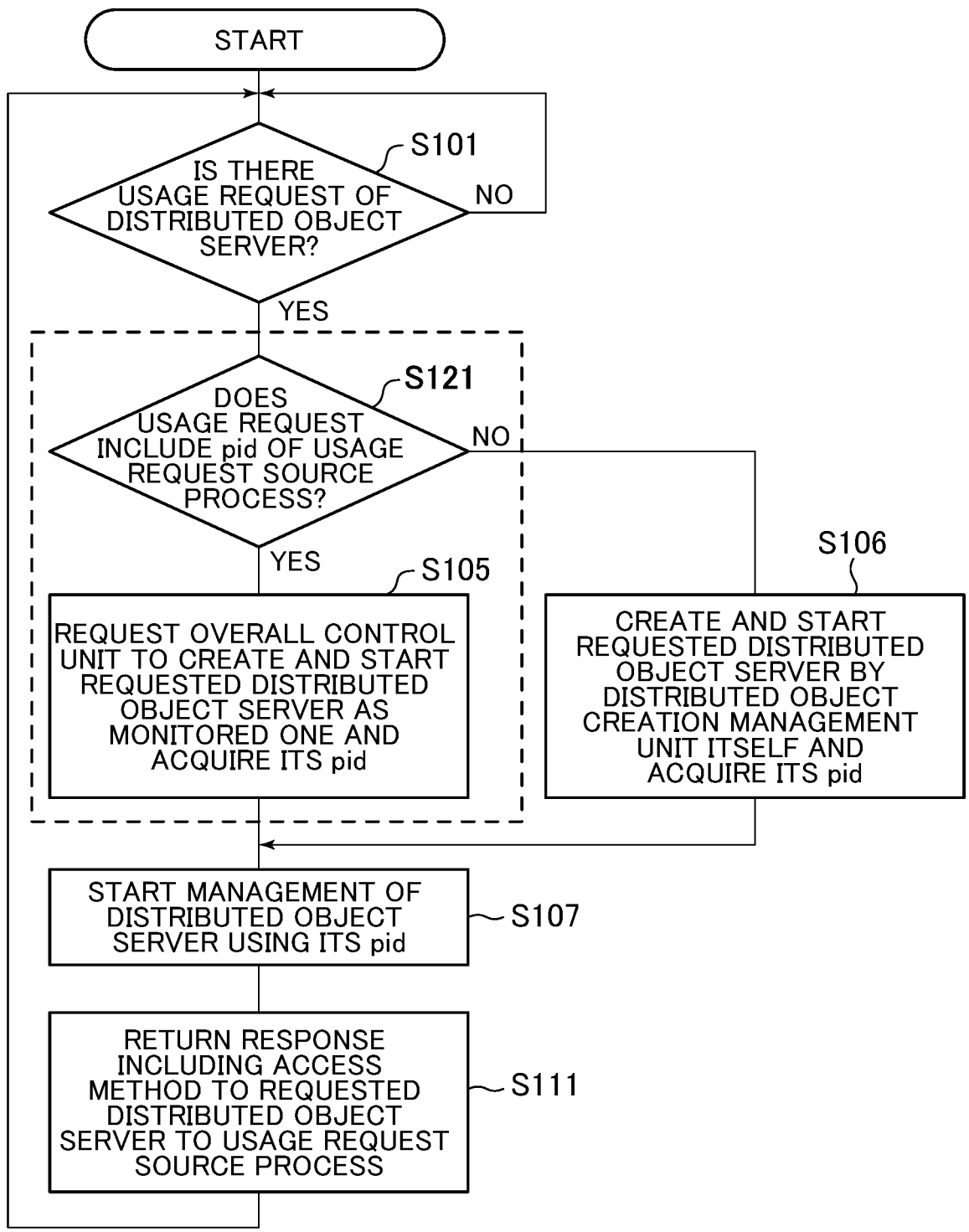
FIG. 14 is a flow chart showing a second distributed object server creation management routine.

FIG. 14 is a flow chart showing a second distributed object server creation management routine performed by the distributed object creation management unit 13. Here, steps performing the same processing as those in FIG. 12 are assigned the same reference characters as FIG. 12.

In this case, as a premise, it is assumed that a usage request source process: (a) knows in advance that the usage request source process itself is a monitored one (a monitored user process 32) by inquiring the overall control unit 20 using its own pid at the time of start of the usage request source process; and (b) knows in advance that a desired distributed object server is already running as a monitored process (a monitored distributed object server 21) (these functions can be implemented by injecting hooks for performing the functions into the usage request source process).

Generally, when requesting usage of a desired distributed object server, an ordinary (non-monitored) process does not send a usage request notification to the distributed object creation management unit 13 with its own pid being included in the notification. In consideration thereof, when the usage request source process itself is a monitored one (a monitored user process 32), the usage request source process sends the usage request notification which includes the pid of the usage request source process itself to the distributed object creation management unit 13.

In step S101, the distributed object creation management unit 13 determines whether or not there is a usage request of a desired distributed object server from a usage request source process. The distributed object creation management unit 13 advances to step S121 when there is a usage request but stands by until a usage request is made when there is no usage request.

In step S121, the distributed object creation management unit 13 determines whether or not a pid of the usage request source process is included in the usage request notification. The distributed object creation management unit 13 advances to step S105 when the pid of the usage request source process is included but advances to step S106 when the pid is not included.

In step S105, the distributed object creation management unit 13 makes a request to the overall control unit 20 to create and start the requested monitored distributed object server 21. After creating and starting the requested monitored distributed object server 21 as its own child process, the overall control unit 20 notifies the distributed object creation management unit 13 of a pid of the requested monitored distributed object server 21.

In addition, the distributed object creation management unit 13 acquires the pid of the requested monitored distributed object server 21 from the overall control unit 20 and advances to step S107.

In step S106, the distributed object creation management unit 13 creates and starts the requested distributed object server that is not a monitored process as its own child process and acquires a pid of the requested distributed object server. Subsequently, the distributed object creation management unit 13 advances to step S107.

Even in step S107, the requested distributed object server which is created and started is managed by the distributed object creation management unit 13 (regardless of whether or not the created and started distributed object server is a monitored process).

Therefore, in step S107, the distributed object creation management unit 13 immediately starts management of the requested distributed object server which is newly created and started using the acquired pid. Subsequently, the distributed object creation management unit 13 advances to step S111.

In step S111, the distributed object creation management unit 13 returns a response including an access method to the requested distributed object server to the usage request source process. Subsequently, the distributed object creation management unit 13 once again returns to step S101.

In this manner, according to the routine shown in FIG. 14, alterations to the distributed object creation management unit 13 is limited to a range indicated by a frame drawn using a bold dashed line in FIG. 14.

In the present embodiment, a distributed object server is created and started in the common user area in order to enable the distributed object server to be shared with other users regardless of whether or not the distributed object server is a monitored process.

However, when a distributed object server is a monitored process, there may be cases where usage of the distributed object server is limited to a usage request source process or to a monitored user process 32 created and started in an individual user area allocated to the user owning the usage request source process for security reasons or the like. In this case, a monitored distributed object server 21 may be created and started in the individual user area in which the usage request source process has been created and started.

In this case, the processing in step S14 shown in FIG. 3 is performed from after a positive determination in step S8 up to before step S10 (immediately before or immediately after step S9). Furthermore, in this case, instead of the overall control unit 20, the monitored user process creation unit 31 allocated to the user can create and start the monitored distributed object server 21.

Note that, program behavior of a process to be monitored is not limited to the behavior described above and may also include interprocess communication. In other words, TCP/IP network communication and the like may also be made as the program behavior to be monitored.

For example, when the OS is Microsoft Windows (registered trademark), a filter driver called WFP (Windows Filtering Platform) may be created and operated in the system area. Accordingly, functions similar to monitoring, control, and registry-protection in a registry access operation using the registry redirector 11 can be realized with respect to the TCP/IP network communication by a monitored process.

Second Embodiment

Next, a second embodiment of the present invention will be described. Here, the same parts and processing as the first embodiment will be denoted by the same reference characters and overlapping descriptions will be omitted.

In the first embodiment, when a usage request of a desired distributed object server is issued from a monitored user process 32, the distributed object creation management unit 13 redirects (transfers) the request itself, including creation and start of the requested monitored distributed object server 21, to the overall control unit 20.

In contrast, in the second embodiment, when a usage request of a desired distributed object server is issued from a monitored user process 32, the distributed object creation management unit 13 itself creates and starts the requested distributed object server.

In this case, when behavior of the requested distributed object server to be made as a monitored process advances between the time of creation and start of the distributed object server and the time when the distributed object server is actually monitored (when the distributed object server becomes a monitored distributed object server 21), there is a risk that omission of monitoring of program behavior may occur.

In consideration thereof, in the second embodiment, when the distributed object creation management unit 13 itself creates the requested distributed object server to be a monitored process, the distributed object creation management unit 13 temporarily stops behavior of the requested distributed object server. In addition, the distributed object creation management unit 13 notifies the registry redirector 11 of a pid of the requested distributed object server and, after obtaining a registration completion response from the registry redirector 11 and confirming that the requested distributed object server has become a monitored process (a monitored distributed object server 21), the distributed object creation management unit 13 restarts behavior of the requested distributed object server.

In other words, by performing synchronization processing between the distributed object creation management unit 13 and the registry redirector 11, an omission of monitoring of program behavior of the requested distributed object server is prevented. Specifically, a third distributed object server creation management routine shown in FIG. 15 is executed in place of the distributed object server creation management routine shown in FIG. 12.

FIG. 15 is a flow chart showing the third distributed object server creation management routine. Note that, steps S101 to S103 are the same as those shown in FIG. 12. After a negative determination in step S103, the routine advances to step S131 shown in FIG. 15.

In step S131, since the requested distributed object server is not running, the distributed object creation management unit 13 itself creates and starts the requested distributed object server and acquires a pid of the requested distributed object server being created. The present step is ordinary processing conventionally performed by the distributed object creation management unit 13.

In step S132, the distributed object creation management unit 13 directly inquires the registry redirector 11 using the pid acquired in step S101 and determines whether or not a usage request source process is a monitored one. The distributed object creation management unit 13 advances to step S133 when the process is a monitored one but advances to step S135 when the process is not a monitored one.

In step S133, the distributed object creation management unit 13 notifies the registry redirector 11 of the pid of the distributed object server acquired in step S131.

In step S134, the distributed object creation management unit 13 determines whether or not there is a response received from the registry redirector 11 to the effect that registration of the pid has been completed. The distributed object creation management unit 13 advances to step S135 when there is a response to the effect that registration has been completed but, when there is no response to the effect that registration has been completed, stands by until the response is made.

In step S135, the distributed object creation management unit 13 starts the requested distributed object server created in step S131 and starts management of the requested distributed object server. Subsequently, the distributed object creation management unit 13 advances to step S108 shown in FIG. 13. The present step is ordinary processing conventionally performed by the distributed object creation management unit 13.

As described above, within a period from the time of creation to start of the requested distributed object server, the distributed object creation management unit 13 notifies the registry redirector 11 of the pid of the requested distributed object server and causes the registry redirector 11 to register the pid. Accordingly, situations where the requested distributed object server to be a monitored process starts behavior before being monitored can be eliminated and an omission of monitoring of program behavior can be avoided.

It should be noted that the present invention is not limited to the embodiments described above and is also applicable to design modifications implemented within the scope of matters described in the claims.

For example, the various aspects described above may be constituted by hardware or by a computer installed with a program recorded on a recording medium.

REFERENCE SIGNS LIST

1 Program behavior monitoring system
11 Registry redirector
12 File system redirector
13 Distributed object creation management unit
20 Overall control unit
20G Monitored distributed object server creation unit
21 Monitored distributed object server
31 Monitored user process creation unit
32 Monitored user process
32P Printing behavior monitoring unit
32C Clipboard behavior monitoring unit

The invention claimed is:

1. A program behavior monitoring control apparatus, comprising at least one processor and at least one non-volatile computer readable medium including computer program code, the at least one non-volatile memory and the computer code configured to, with the processor, cause the program behavior monitoring control apparatus to at least:

receive a notification from a distributed object creation management apparatus upon receipt by the distributed object creation management apparatus of a usage request for a distributed object server from an application program, wherein the distributed object creation management apparatus is configured to create the distributed object server in response to receiving the usage request for the distributed object server from the application program and to retain identification information for the distributed object server;

create the distributed object server as a child process of the program behavior monitoring control apparatus itself instead of as a child process of the distributed object creation management apparatus;

register identification information of the distributed object server in a process list of the program behavior monitoring control apparatus; and notify the distributed object creation management apparatus of the identification information of the distributed object server, wherein the notification requests creation of the distributed object server by the program behavior monitoring control apparatus instead of by the distributed object creation management apparatus, wherein the distributed object creation management apparatus sends the notification to the program behavior monitoring control apparatus when it is determined that the application program is monitored by the program behavior monitoring control apparatus responsive to a user request for monitoring the application program, wherein the application program directly communicates with the distributed object server, wherein the usage request from the application program comprises a request for use of an execution entity of the distributed object server which is specified to be executed inside a common user area, wherein the execution entity is created as the child process of the program behavior monitoring control apparatus in the common user area instead of as a child process of the application program in an individual user area, and wherein the common user area comprises a first memory area in which processes execute that are usable in a shared manner by all users of a plurality of users.

2. The program behavior monitoring control apparatus according to claim 1, further configured to:

acquire, every time a new process is started, identification information of the new process and identification information of a parent process of the new process;

refer to each piece of identification information acquired by the program behavior monitoring control apparatus every time the new process is started; and when the identification information of the parent process of the new process is registered in the process list, register the identification information of the new process in the process list.

3. The program behavior monitoring control apparatus according to claim 1, wherein the individual user area comprises a second memory area in which processes execute that are usable by a particular individual user.

4. A program behavior monitoring control apparatus, comprising at least one processor and at least one non-volatile computer readable medium including computer program code, the at least one non-volatile memory and the computer code configured to, with the processor, cause the program behavior monitoring control apparatus to at least:

receive a notification from a distributed object creation management apparatus upon receipt by the distributed object creation management apparatus of a usage request for a distributed object server from an application program, wherein the distributed object creation management apparatus is configured to create the distributed object server in response to receiving the usage request for the distributed object server from the application program and to retain identification information for the distributed object server;

register identification information of the distributed object server in a process list of the program behavior monitoring control apparatus; and notify the distributed object creation management apparatus of a registration completion response, wherein the notification comprises the identification information of the distributed object server created by the distributed object creation management apparatus based on the usage request for the distributed object server from the application program, wherein the distributed object creation management apparatus sends the notification to the program behavior monitoring control apparatus when it is determined that the application program is monitored by the program behavior monitoring control apparatus responsive to a user request for monitoring the application program, wherein the application program directly communicates with the distributed object server, wherein the usage request from the application program comprises a request for use of an execution entity of the distributed object server which is specified to be executed inside a common user area, wherein the execution entity is created as the child process of the distributed object creation management apparatus in the common user area instead of as a child process of the application program in an individual user area, and wherein the common user area comprises a first memory area in which processes execute that are usable in a shared manner by all users of a plurality of users.

5. A distributed object creation management apparatus, comprising at least one processor and at least one non-volatile computer readable medium including computer program code, the at least one non-volatile memory and the computer code configured to, with the processor, cause the distributed object creation management apparatus to at least:

receive a usage request for a distributed object server from an application program;

upon determining that identification information of the application program is not registered in a process list of a program behavior monitoring control apparatus, create the distributed object server for which the usage request has been made;

upon determining that the identification information of the application program is registered in the process list of the program behavior monitoring control apparatus, send a notification to the program behavior monitoring control apparatus; and receive identification information of the distributed object server created by the program behavior monitoring control apparatus from the program behavior monitoring control apparatus, wherein the notification requests creation of the distributed object server by the program behavior monitoring control apparatus instead of by the distributed object creation management apparatus, wherein the distributed object creation management apparatus sends the notification to the program behavior monitoring control apparatus when it is determined that the application program is monitored by the program behavior monitoring control apparatus responsive to a user request for monitoring the application program, wherein the application program directly communicates with the distributed object server, wherein the usage request from the application program comprises a request for use of an execution entity of the distributed object server which is specified to be executed inside a common user area, wherein the execution entity is created as the child process of the program behavior monitoring control apparatus in the common user area instead of as a child process of the application program in an individual user area, and wherein the common user area comprises a first memory area in which processes execute that are usable in a shared manner by all users of a plurality of users.

6. A distributed object creation management apparatus, comprising at least one processor and at least one non-volatile computer readable medium including computer program code, the at least one non-volatile memory and the computer code configured to, with the processor, cause the distributed object creation management apparatus to at least:

receive a usage request for a distributed object server from an application program;

create the distributed object server for which the usage request has been made;

suspend an execution of the distributed object server;

upon determining that identification information of the application program is registered in a process list of a program behavior monitoring control apparatus, send a notification to the program behavior monitoring control apparatus;

receive a registration completion response from the program behavior monitoring control apparatus; and unsuspend the execution of the distributed object server, wherein the notification comprises identification information of the distributed object server created by the distributed object creation management apparatus based on the usage request for the distributed object server from the application program, wherein the distributed object creation management apparatus sends the notification to the program behavior monitoring control apparatus when it is determined that the application program is monitored by the program behavior monitoring control apparatus responsive to a user request for monitoring the application program, wherein the application program directly communicates with the distributed object server, wherein the usage request from the application program comprises a request for use of an execution entity of the distributed object server which is specified to be executed inside a common user area, wherein the execution entity is created as the child process of the distributed object creation management apparatus in the common user area instead of as a child process of the application program in an individual user area, and wherein the common user area comprises a first memory area in which processes execute that are usable in a shared manner by all users of a plurality of users.

* * * * *